US009152443B2

(12) United States Patent
Neuse et al.

(10) Patent No.: US 9,152,443 B2
(45) Date of Patent: Oct. 6, 2015

(54) SYSTEM AND METHOD FOR AUTOMATED ASSIGNMENT OF VIRTUAL MACHINES AND PHYSICAL MACHINES TO HOSTS WITH RIGHT-SIZING

(75) Inventors: Douglas M. Neuse, Austin, TX (US);
Laurence E. Clay, Austin, TX (US);
Neal Tibrewala, Austin, TX (US);
Kenneth C. Zink, Austin, TX (US);
Paul Peterson, Round Rock, TX (US)

(73) Assignee: CA, Inc., New York, NY (US)

( * ) Notice: Subject to any disclaimer, the term of this patent is extended or adjusted under 35 U.S.C. 154(b) by 504 days.

(21) Appl. No.: 13/549,221

(22) Filed: Jul. 13, 2012

(65) Prior Publication Data
US 2014/0019965 A1    Jan. 16, 2014

(51) Int. Cl.
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5088* (2013.01); *G06F 2009/4557* (2013.01); *G06F 2209/5022* (2013.01)

(58) Field of Classification Search
None
See application file for complete search history.

(56) References Cited

U.S. PATENT DOCUMENTS

| 7,769,843 | B2 | 8/2010 | Neuse et al. |
| 7,957,948 | B2 | 6/2011 | Zink et al. |
| 8,291,411 | B2* | 10/2012 | Beaty et al. ............... 718/1 |
| 2007/0271560 | A1* | 11/2007 | Wahlert et al. ............ 718/1 |
| 2009/0300173 | A1* | 12/2009 | Bakman et al. .......... 709/224 |

* cited by examiner

*Primary Examiner* — Meng An
*Assistant Examiner* — Dar-Eaum Nam
(74) *Attorney, Agent, or Firm* — Baker Botts L.L.P.

(57) ABSTRACT

A system and method for reconfiguring a computing environment comprising a consumption analysis server, a placement server and a data warehouse in communication with a set of data collection agents and a database. The consumption analysis server operates on measured resource utilization data to yield a set of resource consumptions in regularized time blocks, collects host and virtual machine configurations from the computing environment and determines available capacity for a set of target hosts. The placement server assigns a set of target virtual machines to the target set of hosts in a new placement that is right-sized according to a set of right-sizing constraints and rules. In one mode of operation the new placement is nearly optimal. In another mode of operation, the new placement is "good enough" to achieve a threshold score based on an objective function of capacity headroom. The new placement is implemented in the computing environment.

15 Claims, 31 Drawing Sheets

RAW MEASURED VM CONSUMPTIONS FOR RESOURCE R1

| VM-1 | DAY 1 | DAY 2 | ... | DAY 30 | ... | DAY 90 |
|---|---|---|---|---|---|---|
| SAMPLE TIME 1 | 0.663 | 0.546 | ... | 0.585 | ... | 0.325 |
| SAMPLE TIME 2 | 0.324 | 0.317 | ... | 0.332 | ... | 0.327 |
| ... | | | ... | | ... | |
| SAMPLE TIME T | 0.278 | 0.406 | ... | 0.116 | ... | 0.056 |

RAW MEASURED VM CONSUMPTIONS FOR RESOURCE Rm

| VM-1 | DAY 1 | DAY 2 | ... | DAY 30 | ... | DAY 90 |
|---|---|---|---|---|---|---|
| SAMPLE TIME 1 | 0.287 | 0.544 | ... | 0.000 | ... | 0.095 |
| SAMPLE TIME 2 | 0.358 | 0.334 | ... | 0.835 | ... | 0.877 |
| ... | | | ... | | ... | |
| SAMPLE TIME T | 0.670 | 0.000 | ... | 0.155 | ... | 0.464 |

FIG. 6A

| VM-2 CONFIG:859 UNITS: TPP | SAMPLE PERIOD 1 | SAMPLE PERIOD 2 | ... | SAMPLE PERIOD Y | 65TH PERCENTILE | 75TH PERCENTILE | 85TH PERCENTILE | 95TH PERCENTILE | |
|---|---|---|---|---|---|---|---|---|---|
| INTERVAL 1 | 127.6 | 116.4 | ... | 105.3 | 113.4 | 115.0 | 119.5 | 125.3 | ... |
| INTERVAL 2 | 74.6 | 60.6 | ... | 62.3 | 73.1 | 75.1 | 77.3 | 83.3 | |
| ... | ... | ... | ... | ... | ... | ... | ... | ... | |
| INTERVAL M | 63.5 | 34.2 | ... | 40.2 | 52.4 | 55.3 | 59.5 | 64.8 | |

FIG. 6B

| 75TH PERCENTILE, TPP | VM-1 | VM-2 | ... | VM-N |
|---|---|---|---|---|
| INTERVAL GROUP 1 | 96.4 | 115.0 | ... | 40.9 |
| INTERVAL GROUP 2 | 73.7 | 75.1 | ... | 35.3 |
| ... | ... | ... | ... | ... |
| INTERVAL GROUP G | 88.6 | 55.3 | ... | 32.6 |

FIG. 6C

GENERAL PLACEMENT METHOD

1009   Determine a threshold (good-enough) placement score as a percentage of an ideal score.

1010   Construct an initial placement of the set of user-specified source machines onto a set of user-specified existing or target hosts using the method specified in INITIAL PLACEMENT METHOD. Set the current placement to this initial placement.

1011   Score the current placement and each host according to the Objective Function.

1012   While (the current placement is not "good enough") and (the number of candidate placements considered so far is not too large) and (the placement execution time is not too large):

1013   Generate a candidate placement* and score the candidate placement.

1014   If the candidate score is better than the current score:

1015        Accept the candidate placement and score as the current placement and current score 1016   End If 1017   End While

FIG. 14

INITIAL PLACEMENT METHOD

1020 In step 1010 of GENERAL PLACEMENT METHOD do the following:

1021 While not all virtual machines have been placed:

1022 Select one of the remaining unplaced virtual machines V at random *

1023 Begin Loop

1024     Select a target host H at random

1025     Tentatively assign V to H, score the resulting placement {(V, H)}** and store the score for {(V, H)}

1026     If the score is "good enough" (greater than the threshold score):

1027         Accept the assignment and Exit Loop (continue with the next virtual machine)

1028     Else If a reasonable number (Max_N_Hosts) have been considered:

1029         Accept the assignment from among those in this Loop for H that results in the best score;

1030         Exit Loop (to continue with the next virtual machine)

1031     End If

1032   End Loop

1033 End While

1034 Result is an initial placement of all VMs onto a set of target hosts.

FIG. 15

ALTERNATE METHOD FOR INITIAL PLACEMENT 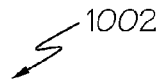

1040 In step 1010 of the GENERAL PLACEMENT METHOD do the following:

1041 Sort the VMs on the most critical resource (the resource with the greatest consumption relative to cluster-wide capacity) from "largest" consumer to "smallest" consumer (Vlist).

1042 Sort the hosts on the most critical resource from largest available headroom capacity to smallest available headroom capacity (Hlist).

1043 While not all virtual machines have been placed:

1044    Select the next unplaced virtual machine V from Vlist.

1045    Begin Loop

1046      Select the next target host H from Hlist

1047      Tentatively assign V to H, score the resulting placement and store the score for {(V, H)}

1048      If the score is "good enough" (greater than threshold score):

1049         Accept the assignment and Exit Loop (continue with the next virtual machine)

1050      Else If a reasonable number (Max_N_Hosts) have been considered:

1051         Accept the assignment among those in this Loop for H that results in the best score;

1052         Exit Loop (to continue with the next virtual machine)

1053      End If

1054    End Loop

1055 Reduce the available capacity of the host just assigned a VM and sort the hosts on available capacity 1056    Continue with the next unplaced virtual machine VM.

1057 End While

FIG. 16

METHOD OF CALCULATING THRESHOLD SCORE $\quad$ 1003

1060 $\quad$ Given a set of target hosts and set of target VMs

1061 $\quad$ For each resource r:

1062 $\quad$ calculate the total resource consumption of all VMs in the set of target VMs as $$Q_{tot}(r) = \sum_V Q(V,r)$$

where Q(V, r) is an Nth percentile consumption of VM V plus an estimated Guest OS overhead for VM V in portable units 1063 $\quad$ If r = CPU, estimate the average number of VCPUs and average number of processor threads consumed per host 1064 $\quad$ Calculate the available capacity on each host:

1065 $\quad$ For each host h:

1066 $\quad\quad$ For each resource r:

1067 $\quad\quad\quad$ Determine the raw capacity $C_{raw}(r)$ for the resource r on host h.

1068 $\quad\quad\quad$ If r = CPU then

1069 $\quad\quad\quad\quad$ Calculate the processor efficiency for host h, $P_{eff}(h)$ using scalability model for host h.

1070 $\quad\quad\quad\quad$ Estimate the VMM efficiency for host h, $VMM_{eff}(h)$ using VMM scalability analysis and the average number of VCPUs per host 1071 $\quad\quad\quad\quad$ Calculate host h CPU effective capacity $C_h(CPU) = C_{raw}(r) \times P_{eff} \times VMM_{eff}$ 1072 $\quad\quad\quad$ Else 1073 $\quad\quad\quad\quad$ Calculate host h effective capacity $C_h(r)$ for resource r as equal to $C_{raw}(r)$ 1074 $\quad\quad\quad$ End if 1075 $\quad\quad\quad$ Calculate the host available capacity $C_A(h, r) = C_h(r)(1-CR(r))$
where CR(r) = a pre-determined capacity reserve for resource r

METHOD OF CALCULATING THRESHOLD SCORE (Continued)

1076  Compute the ideal resource scores:

1077  For each resource r:

1078  Calculate the total available capacity of the target set of hosts according to:

$$C_{tot}(r) = \sum_h C_A(h,r)$$

1079  Calculate the ideal resource score: $S_R(r) = (1 - Q_{tot}(r)/C_{tot}(r))$ 1080  Compute the ideal overall score as the minimum of all ideal resource scores: $S_T = \min(S_R(r))$ 1081  Compute the threshold score as a predetermined fraction F of the ideal score: $S_{th} = S_T \times F$

FIG. 17B

REFINE PLACEMENT METHOD        ⟋1004

1089   After the initial placement, the current placement is iteratively refined. The current placement is improved by reassigning one or more VMs. This method is substituted for steps 1012-1017 of the GENERAL PLACEMENT METHOD.

1090   Sort the hosts in increasing score order into HLIST

1091   Repeat

1092     Select a VM V from the worst host in HLIST*

1093     Refine: (Single-move refinement)

1094        Tentatively assign V to the best host in HLIST and rescore the worst and best host to arrive at an overall score.

1095        If that tentative reassignment improves the overall score:

1096           Accept the reassignment, re-sort the hosts into HLIST and continue with another single-move refinement at the Select step 1097        Else 1098           Tentatively reassign V to the remaining hosts in increasing score order until an improvement in the cluster score occurs or all candidate hosts have been considered 1099           If no reassignment of V to any host improves the overall score, then give up on V and select another VM V' from the worst host in HLIST and Refine: again 1100           If reassignment of all movable VMs on the worst host have been attempted without success, then set the worst host aside and proceed to refine the remaining subset of hosts in HLIST, repeating at the Select step 1101        End If 1102     End Refine 1103   Until overall score is "good enough" or the number of refinement iterations is too large 1104   * Worst host is host with smallest score and best host is host with highest score.

1105   ** "overall" means any of a small set of hosts, a cluster, a set of clusters. A set of clusters is a large set of hosts, with some shared resources per cluster that are accounted for.

FIG. 18

A PREFERRED ALGORITHM FOR THE TPP CALCULATION FOR VMS UTILIZES A LOOKUP TABLE AS FOLLOWS:

1120  Pre-compute a mapping table containing records with a configuration descriptor, a CPU measurement and measurement type, and a TPP calculated from a component scalability model for the hardware configuration and measurement.

1121  Store the mapping table in a database

1122  Perform a query on the database with the host server and VM configuration and the measurement value (and type)

1123  The query returns the closest matching record

CONVERTING ORDINARY UTILIZATION TO RESOURCE CONSUMPTION IN PORTABLE UNITS

1129 // Ordinary CPU utilization is a measured number of active threads divided by the maximum number of active threads possible for the CPU, regardless of actual delivered work.

1130 // Capacity_Utilization equals the capacity consumed divided by the configured capacity (in units of effective number of threads):

1131 $Capacity_Utilization = $Total_Delivered_Work / $Capacity;

1132 // CPU Capacity (in units of effective number of threads) is the effective delivered work when all threads are active:

1133 $Capacity = Delivered_Work($N_Threads);

1134 //The Delivered_Work (consumed) is a weighted sum of the delivered work over each processor state from 1 to N_Threads active:

1135 foreach my $N_Tasks_Active (1..$N_Threads)

1136 {

1137    $Total_Delivered_Work +=

1138     State_Probability($N_Tasks_Active, $Total_Utilization, $N_Threads) *

1139     Delivered_Work($N_Tasks_Active); }

1140 // State_Probability returns the probability of N_Tasks_Active given Ordinary_Utilization and N_Threads_Configured. This function estimates the state probability distribution from ordinary utilization and assumes a binomial distribution of processor state probabilities.

1141 return N_Choose_I($N_Threads_Configured, $N_Tasks_Active) *

1142    ($Ordinary_Utilization ** $N_Tasks_Active) *

1143    ((1 - $Ordinary_Utilization) ** ($N_Threads_Configured - $N_Tasks_Active));

FIG. 20A

CONVERTING ORDINARY UTILIZATION TO RESOURCE CONSUMPTION IN PORTABLE UNITS (Continued)

1145 //Delivered_Work - the work delivered when N threads are active is equal to the sum of the work delivered on each active thread on each core on each chip. Some of the threads, cores and chips will be idle when N is less than the total number of threads.

1146 for (my $I = 0; $I< $hwinfo{NCHIPS}; $I++)

1147 {

1148    for (my $J = 0; $J< $hwinfo{NCORES}; $J++)

1149    {

1150      $Delivered_Work += Total_Delivered_Capacity($N, $I, $J);

1151    }

1152 }

1153 //Total_Delivered_Capacity - the work delivered by the active threads on core J of chip I when N tasks are executing equals the efficiency experienced by those threads multiplied by the number of such threads:

1154 return Total_Efficiency($N, $I, $J) * N_Contending($Thread, $N, $I, $J);

1155 // N_Contending - Returns the number of contending items associated with object O (Thread,Core or Chip) experienced by the threads executing on core J within chip I when the number of tasks executing is N 1156 my ($O, $N, $I, $J) = @_;

1157 //Total Efficiency - Return the total efficiency experienced by the threads executing on core J of chip I when N tasks are executing 1158 return 1159 Object_Efficiency($OS, $N, $I, $J) *

Object_Efficiency($Thread, $N, $I, $J) *

Object_Efficiency($Core, $N, $I, $J) *

Object_Efficiency($Chip, $N, $I, $J);

FIG. 20B

VMM SCALABILITY METHOD

1180   VMM_Thread_Overhead = (MaxOverhead(VMM) / 100) * (A) * (N_Threads_Executing / Total_N_Processor_Threads)

1181   VMM_VCPU_Overhead = (MaxOverhead(VMM) * (1 - A) *
       Minimum(1, (Total_Configured_VCPUs(Host) / ReferenceNVCPUs(VMM)))

1182   VMM_Total_Overhead = VMM_Thread_Overhead + VMM_VCPU_Overhead

1183   Given a particular assignment under consideration, N_Theads_Executing on a host as is estimated as:

1184         N_Threads_Executing = Total capacity consumption of the VMs assigned to the host /
       Permitted Consumption of each physical processor thread on the host

FIG. 21

SYSTEM AND METHOD FOR AUTOMATED ASSIGNMENT OF VIRTUAL MACHINES AND PHYSICAL MACHINES TO HOSTS WITH RIGHT-SIZING

BACKGROUND

The present disclosure relates to performance of computing systems, and more specifically, to a system and method for the placement and management of actual and virtual machines in modern computing environments containing virtualization hosts, including cloud computing environments. The term "cloud computing environment" is used to represent all computing environments.

A cloud computing environment provides a set of services through use of one or more data centers accessible by a set of clients usually via a network such as the Internet. A data center includes a collection of computer clusters, storage subsystems and other components connected by a computer network. In a virtualization environment, each host in a computer cluster provides a set of physical resources such as CPUs, memory, disks and network interface cards (NICS) and runs a virtual machine monitor (VMM) that emulates a set of virtual machines. Each virtual machine is configured with a set of virtual resources such as virtual CPUs (VCPUs) and memory.

In a cloud computing environment, appropriate assignment of virtual machines to hosts and configuration of virtual machines, hosts, resource pools and computer clusters affects performance, service agreements and resource availability. Assignment of virtual machines to differing hosts is often required to provide optimum load balancing and manage infrastructure costs. The size, complexity and rate of change of resource consumption makes assignment of virtual machines to hosts difficult and time consuming. So, an automated process for optimizing assignment is required.

Appropriate placement of virtual machines is related to a classical bin packing problem, in that resources consumed by each virtual machine must be "packed" into the corresponding resource "bin" on a host. Each virtual machine when deployed on a host consumes a portion of the host's resource capacity as a function of its configuration and workload. Thus, in the virtual machine placement problem (1) each virtual machine presents a different "size" (resource consumption) over time (2) the host resource bin sizes (resource capacities) vary from placement to placement and (3) the set of resource consumptions by each virtual machine may be assigned to only one host.

BRIEF SUMMARY

An infrastructure management system and method is disclosed for reconfiguration of a source computing system into a destination computing system with a new placement of a target set of virtual machines on a target set of hosts. According to one aspect of the present disclosure, the infrastructure management system comprises a first server having a first processor, a first memory, and a first set of program instructions stored in the first memory. The first processor executes the first set of program instructions and determines a set of host resource capacities and a set of virtual machine resource consumptions for a source computing system. The first processor further determines a new placement of the target set of virtual machines on the target set of hosts and modifies the new placement to meet a set of right-sizing constraints, wherein the new placement comprises a set of virtual machine-host pairs from the target set of hosts and the target set of virtual machines.

In another aspect of the present disclosure, a selected host resource capacity of the set of host resource capacities is derived from a set of component capacities, a processor efficiency, a virtual machine monitor efficiency and a capacity reserve.

In another aspect of the present disclosure, the infrastructure management system further receives a set of resource utilization data for a set of resources, receives a source configuration comprising a set of physical machine configurations and a set of virtual machine configurations and determines a set of host resource capacities and a set of virtual machine resource consumptions for the source computing system. The infrastructure management system transforms the resource utilization data into the set of virtual machine resource consumptions, determines the set of host resource capacities based on the source configuration and estimates a guest operating system overhead consumption for the set of virtual machine configurations. The infrastructure management system determines a set of planning percentiles for the set of virtual machine resource consumptions.

In another aspect, the infrastructure management system determines a threshold requirement from the set of planning percentile resource consumptions and identifies a target placement for the target set of hosts and the target set of virtual machines that meets the threshold requirement. The new placement is assigned to be the target placement. A set of movable virtual machines are moved from the source computing system and installed in the destination computing system according to the new placement along with a set of new virtual machines.

A method for reconfiguring the source computing system to the destination computing system is disclosed. According to a first aspect of the present disclosure, the reconfiguration method receives resource utilization data from a set of resources, receives a target set of hosts and a target set of virtual machines, determines a set of host resource capacities and a set of virtual machine resource consumptions for the source computing system and determines a set of interval groups. The reconfiguration method further determines a new placement of the target set of virtual machines on the target set of hosts, the set of host resource capacities and the set of virtual machine resource consumptions and modifies the new placement to meet a set of right-sizing constraints. The new placement comprises a set of virtual machine-host pairs derived from the target set of hosts and the target set of virtual machines.

In another aspect of the method, an available capacity and a total virtual machine resource consumption for the target set of hosts for each resource in the set of resources is further determined. The method computes a normalized difference between the available capacity and the total virtual machine resource consumption for each resource in the set of resources. The threshold requirement is derived from the normalized difference. In a right-sizing aspect, a number of hosts to add to the target set of hosts is determined, based on the normalized difference. In another right-sizing aspect, a number of hosts to remove from the target set of hosts is determined, based on the normalized difference.

In another aspect of right-sizing according to the present disclosure, the method receives the set of right sizing constraints including a set of nearest allowable virtual machine resource configurations and determines a set of eligible virtual machines from the target set of virtual machines, wherein an eligible virtual machine in the set of eligible virtual machines comprises a virtual machine resource configuration and replaces the virtual machine resource configuration with a right-sized virtual machine resource configuration, from the set of nearest allowable virtual machine resource configurations.

In another aspect of right-sizing, determining the set of eligible virtual machines further comprises selecting only a set of virtual machines that were moved during the placement analysis. In another aspect, determining the set of eligible virtual machines further comprises selecting a set of virtual machines that were derived from a set of physical servers. In another aspect of right-sizing according to the present disclosure, the method receives a set of virtual machine resource rules and determines a set of eligible virtual machines from the target set of virtual machines, wherein an eligible virtual machine in the set of eligible virtual machines comprises a virtual machine resource configuration. The method applies the set of virtual machine resource rules to the virtual machine resource configuration, wherein a right-sized virtual machine resource configuration for the eligible virtual machine in the set of eligible virtual machines is derived.

In another aspect of the present disclosure, the new placement is implemented in the destination computing system.

BRIEF DESCRIPTION OF THE DRAWINGS

Aspects of the present disclosure are illustrated by way of example and are not limited by the accompanying figures with like references indicating like elements.

FIG. 6A is a diagram showing an example set of historical resource consumption data tables measured for a set of virtual machines across a period of days at various sample times.

FIG. 6B is a diagram of an example resource consumption interval table for a set of intervals defined over a set of sample periods.

FIG. 6C is a diagram of an example set of rolled up percentiles of resource consumptions for a set of virtual machines.

FIG. 14 is a pseudocode listing of a general placement method.

FIG. 15 is a pseudocode listing of an initial placement method.

FIG. 16 is a pseudocode listing of an initial placement method.

FIGS. 17A and 17B show a pseudocode listing of a method for calculating a threshold score.

FIG. 18 is a pseudocode listing of a refinement method for placement.

FIG. 19 is a pseudocode listing of an algorithm for determining processor consumption in portable units.

FIGS. 20A and 20B show a pseudocode listing of a method to convert ordinary utilization to resource consumption.

FIG. 21 is a pseudocode listing of an example VMM scalability method.

DETAILED DESCRIPTION

Figure 1:
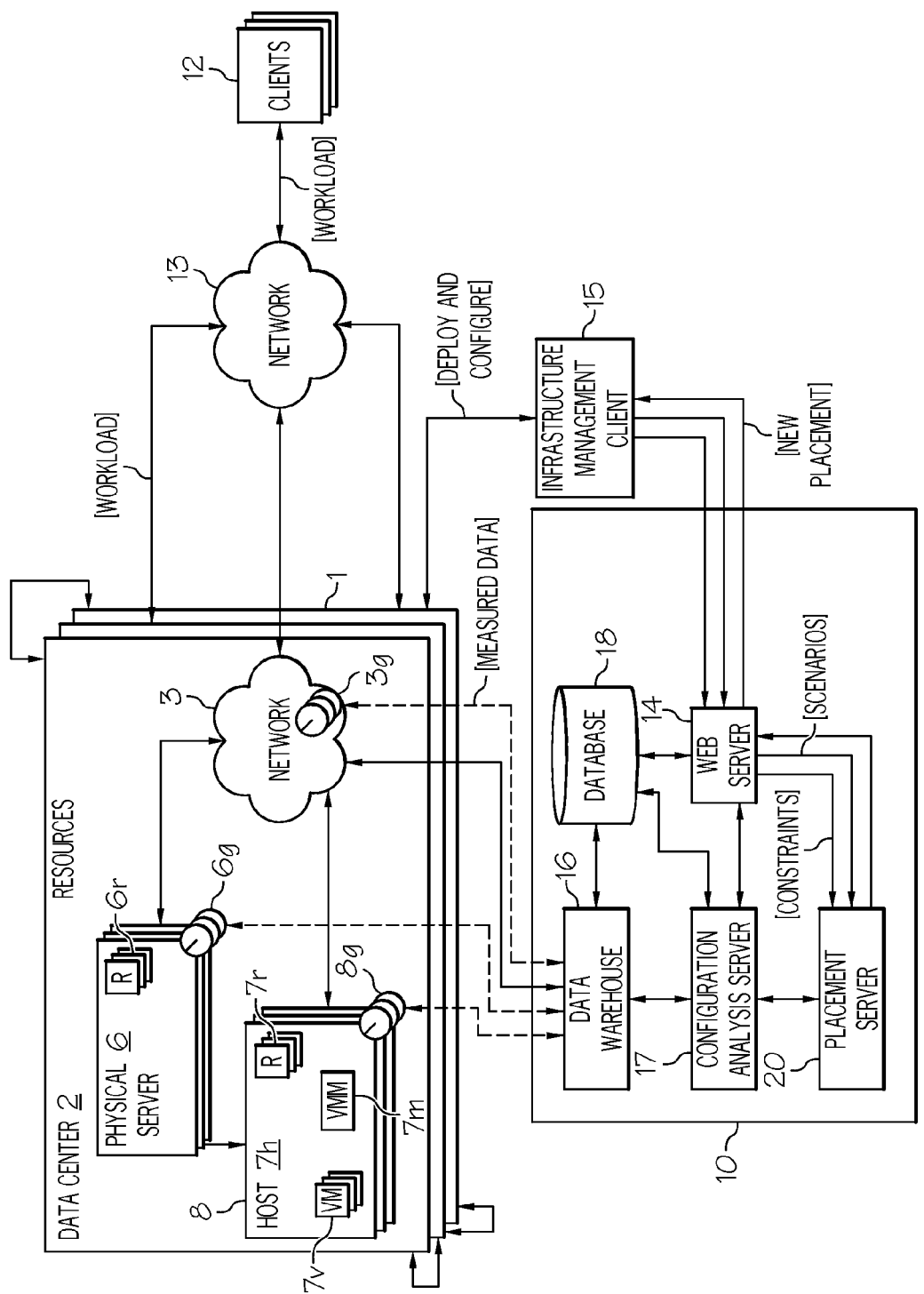
FIG. 1 is a block diagram illustrating a system for optimization and reconfiguration of virtual machines for a cloud computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The systems and methods of the present disclosure are applicable to any modern computing environment containing virtualization hosts including a cloud computing environment. For the purposes of the present disclosure, a cloud computing environment physically comprises a set of host servers, interconnected by a network, which can be organized in any of a number of ways including, but not limited to the examples that follow here and in the descriptions of the drawings. For example, the set of host servers can be organized by application function such as web servers, database servers and specific application servers of multiple applications. The set of host servers can be organized by physical location, for example, a first subset of host servers operating in a first data center, a second subset of host servers operating in a second data center on a first network, a third set subset of host servers operating in the second data center on a second network and so forth. The set of host servers can be organized into a set of host clusters wherein each host cluster comprises a subset of host servers and functions to manage a set of shared resources in a set of resource pools for the subset of host servers. Multiple sets of host clusters within a cloud computing environment can be further organized into logical groups of clusters referred to as superclusters.

A dominant attribute of a cloud computing environment is that applications and resources of the associated computing cloud are available as a set of services to client systems over the network, which is usually a wide area network such as the Internet but also encompasses a corporate intranet, where the applications and resources are physically diversified.

Another important attribute of a cloud computing environment utilized in this present disclosure is that cloud based applications and resources are usually operated and managed by a set of virtual machines deployed across the set of host servers, wherein each host server can host multiple virtual machines (VMs) and includes a virtual machine monitor (VMM) that manages the local resources of the host server an installs new virtual machines. A virtual machine can be moved from one host server to another host server as a complete computing unit, having a guest operating system and a specified set of resource requirements managed by the VMM such as processor consumption requirements (measured in virtual processing units known as VCPUs), memory consumption requirements, network bandwidth requirements and so forth. In many virtualization environments, the VMM is referred to as a hypervisor.

Virtualization tools for creating and managing virtual machines for most computer and server hardware platforms are provided by a number of vendors including, for example, VMware, Inc. of Palo Alto, Calif. (VMware), IBM of (AIX, z/VM), Hewlett Packard of (HP-UX) and various open source virtualization tools for Linux (e.g. XEN, OpenVZ, Vserver, KVM). The embodiments of the present disclosure are not limited by any specific virtualization tool, but rather intended to interwork with all existing and future virtualization tools.

Optimization in the context of the present disclosure generally means risk minimization. Reconfiguration according to the present disclosure is done by performing a process of placing a set of VMs on a set of hosts resulting in multiple placements. An objective function is described for scoring placements and selecting placements that minimize risk that any resource on any host becomes over consumed. The reconfiguration process has an additional benefit of balancing resource consumption across the set of hosts thereby reducing response times.

Referring to FIG. 1, a system for reconfiguration and optimization of a cloud computing environment 1 is shown. Cloud computing environment 1 comprises a group of data centers including data center 2 connected to a network 13. Data center 2 is a representative data center in the group of data centers. A set of clients 12, also connected to network 13, are connected to cloud computing environment 1 and produce a workload for computing operations in the cloud computing environment. Data center 2 comprises a network 3 a set of physical servers 6 and cluster 8 of host servers. A physical server in the set of physical servers 6 comprises a set of resources 6r, including but not limited to CPU, memory, network interface and operating system resources. Set of physical servers 6 is instrumented with set of data collection agents 6g that monitor the real time resource consumption of the set of resources 6r. Host 7h is a representative host server in cluster 8 of host servers. Host 7h comprises a set of host resources 7r, including but not limited to CPU, memory, network interface and operating system resources. Host 7h further comprises a set of virtual machines 7v, of which each virtual machine consumes a portion of the set of host resources 7r. Host 7h further comprises a virtual machine monitor (VMM) 7m that negotiates and manages the resources for set of virtual machines 7v and performs other general overhead functions. VMM 7m is one member of a set of virtual machine monitors wherein each virtual machine monitor is included with each host in cluster 8.

Cluster 8 includes a set of data collection agents 8g that monitor the real time resource consumption of the set of resources 7r and monitors resources for all other hosts in the cluster. Network 3 also includes a set of network data collection agents 3g that monitor the real time consumption of network resources, for example, router and interconnection usage and workload arrival rates. Networks 3 and 13 are typically Ethernet based networks. Networks 3 and 13 can be a local area network, wide area network, public network or private network as required by applications served by the cloud computing environment.

The group of data centers are monitored and managed by a novel infrastructure management system 10 communicating with an infrastructure management client 15. The infrastructure management system 10 comprises a data warehouse 16 with database 18, a consumption analysis server 17 connected to data warehouse 16 and database 18, a placement server 20 connected to consumption analysis server 17 and database 18 and a web server 14 connected to infrastructure manager client 15, database 18 and placement server 20.

In use, data warehouse 16 interacts with sets of data collection agents 3g, 6g and 8g, to receive, timestamp, categorize and store the sets of resource measurements into database 18. Consumption analysis server 17 includes a first set of programmed instructions that further operates on the sets of resource measurements in database 18, as will be described in more detail below.

In use, placement server 20 receives a set of constraints and a set of scenarios which include, but are not limited to, a set of target placements. The set of scenarios can include the existing placement as a target placement presented to placement server for optimization wherein the target placement is converted by the placement server to a new placement with existing VMs moved from one host server to another host server and new VMs placed in the new placement. The set of scenarios also includes other changes to the cloud computing environment, such as changes to the workload and the addition or removal of a host server, cluster, or data center from the cloud computing environment. The set of constraints and the set of scenarios are received from any of the group consisting of the infrastructure management client 15, web server 14, an application programming interface (API) and a combination thereof.

A placement is defined as a set of virtual machine and host pair assignments {(V,H)}. For example, a placement is described by a set of pairings {(v1, h0), (v2, h0) ... (vN,h0), (s1,h0)} between each virtual machine in set of virtual machines 7v (v1, v2, ..., vN) and set of physical server 6 (s1) on the single host 7h (h0). However, a placement more generally comprises all virtual machines, existing and newly configured, within host cluster 8 and within all host clusters in the group of data centers.

Placement server 20 interacts with consumption analysis server 17 and database 18 to provide a new placement for cloud computing environment 1. The new placement is generally implemented by using virtualization tools to move VMs from one host server to another host server and from one physical server to a new host server.

Figure 2:
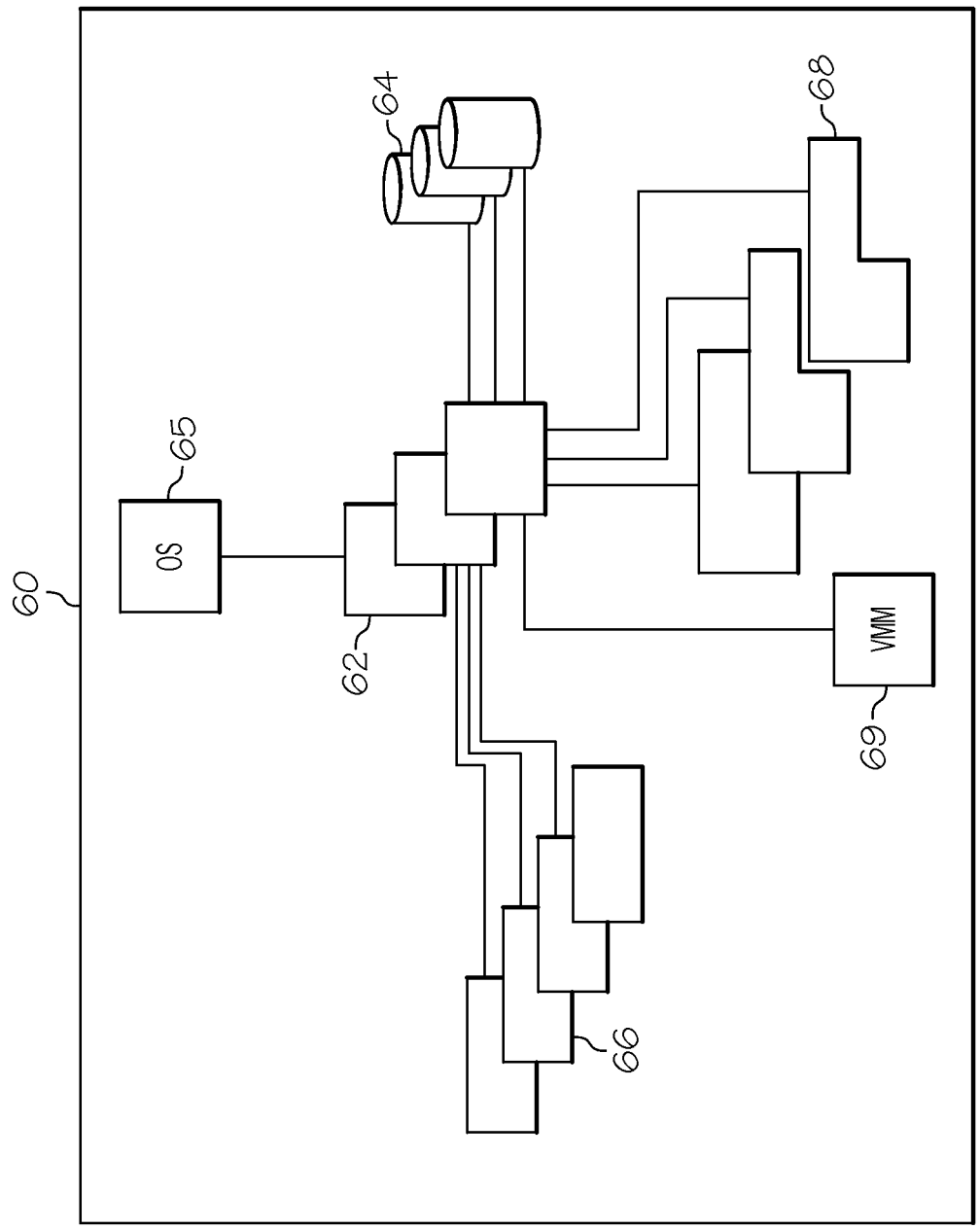
FIG. 2 is a block diagram of a host server.

FIG. 2 shows a block diagram of a host server 60 comprising a set of internal resources including CPUs 62, disk storage 64, memory 66 and network interface cards (NICS) 68. Host server 60 comprises a virtual machine monitor (VMM) 69. In some virtualization environments, host server 60 also includes a native operating system (OS) 65.

In an embodiment, the consumption analysis server and the placement server operate on different physical machines. In an alternate embodiment two or more of the group consisting of the database, data warehouse, consumption analysis server and the placement server reside on single physical machine. In another alternate embodiment, there is no web server and the infrastructure management client communicates directly to the database, the consumption analysis server, the placement server.

Figure 3:
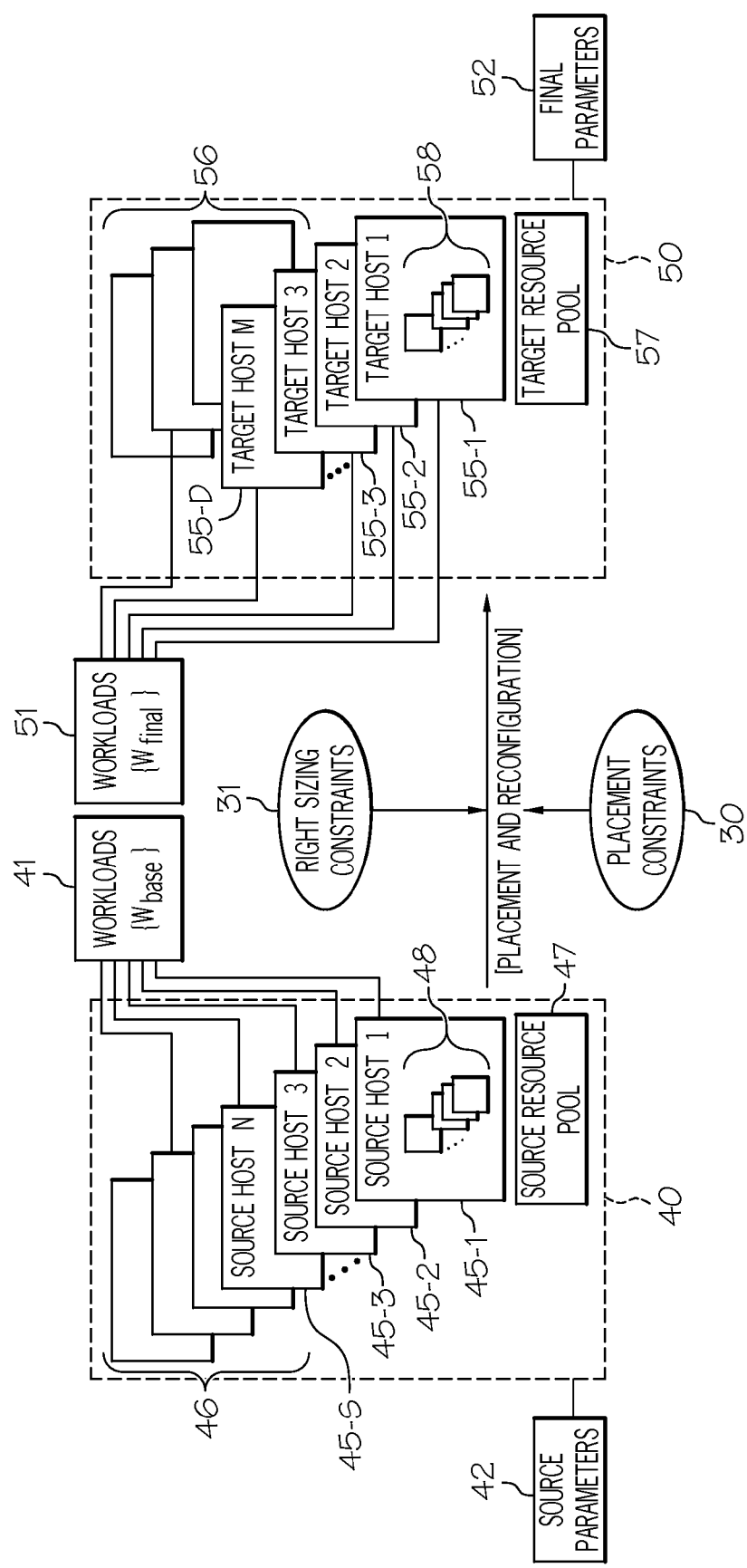
FIG. 3 is a block diagram illustrating virtual machine reconfiguration.

More detail of the apparatus involved in an infrastructure reconfiguration process is shown in the block diagram of FIG. 3. In a source cloud configuration 40 characterized by a set of source parameters 42, a base set of workloads 41 are serviced by a collection of source applications executing as programmed instructions on a source set of virtual machines 48 and a source set of physical servers 46. The source set of virtual machines 48 are deployed amongst a set of S source hosts, source host 45-1 to source host 45-S. The set of 0 source hosts draw on their internal resources but can also draw from a source resource pool 47 as required by the set of source applications. Each source virtual machine includes a guest operating system (guest OS).

The source cloud configuration is typically an existing cloud configuration for a cloud computing environment which is reconfigured and implemented as the destination cloud configuration 50. The destination cloud configuration is provided by the novel infrastructure management system of the present disclosure according to a set of placement constraints 30, a set of right-sizing constraints 31 and according to differences between base set of workloads 41 and final set of workloads 51. In many applications of the infrastructure management system, the final set of workloads is the same as the base set of workloads. In a scenario analysis involving workload forecasting the base and final sets of workloads will be different.

Destination cloud configuration 50 is characterized by a set of destination parameters 52. Final set of workloads 51 are serviced by a collection of destination applications executing as programmed instructions on a destination set of virtual machines 58 and a destination set of physical servers 56. The destination set of virtual machines 58 are deployed amongst a set of D destination hosts, destination host 55-1 to destination host 55-D. The set of D destination hosts draw on their internal resources but can also draw from a destination resource pool 57 as required by the set of destination applications.

The set of placement constraints 30 include constraints such as a threshold requirement for reconfiguration, the threshold requirement being specified against a metric calculated for the destination cloud configuration, The preferred metric, relating to an objective function of resource capacity-consumption headroom and a preferred method of computing the threshold requirement against the preferred metric will be described in more detail below. Other placement constraints include, but are not limited to, a number of iterations performed in a method, a list of unmovable VMs, constraints on computation of guest OS overhead for VMs and constraints on VMM overhead for host servers.

The set of right-sizing constraints 31 relate to matching the set of D destination hosts to a set of host server templates approved by the governing IT organization or consistent with industry standards. The host server templates provide hardware configurations that further constrain the resources available to the set of D destination hosts. Other right-sizing constraints include, but are not limited to, a list of VMs that cannot be right-sized, how often the candidate placements are right-sized while iterating through a placement process, the addition or removal of host servers, the size of clusters, a cluster positioning within a data center which could affect network resources and the size of the destination resource pool.

Figure 4:
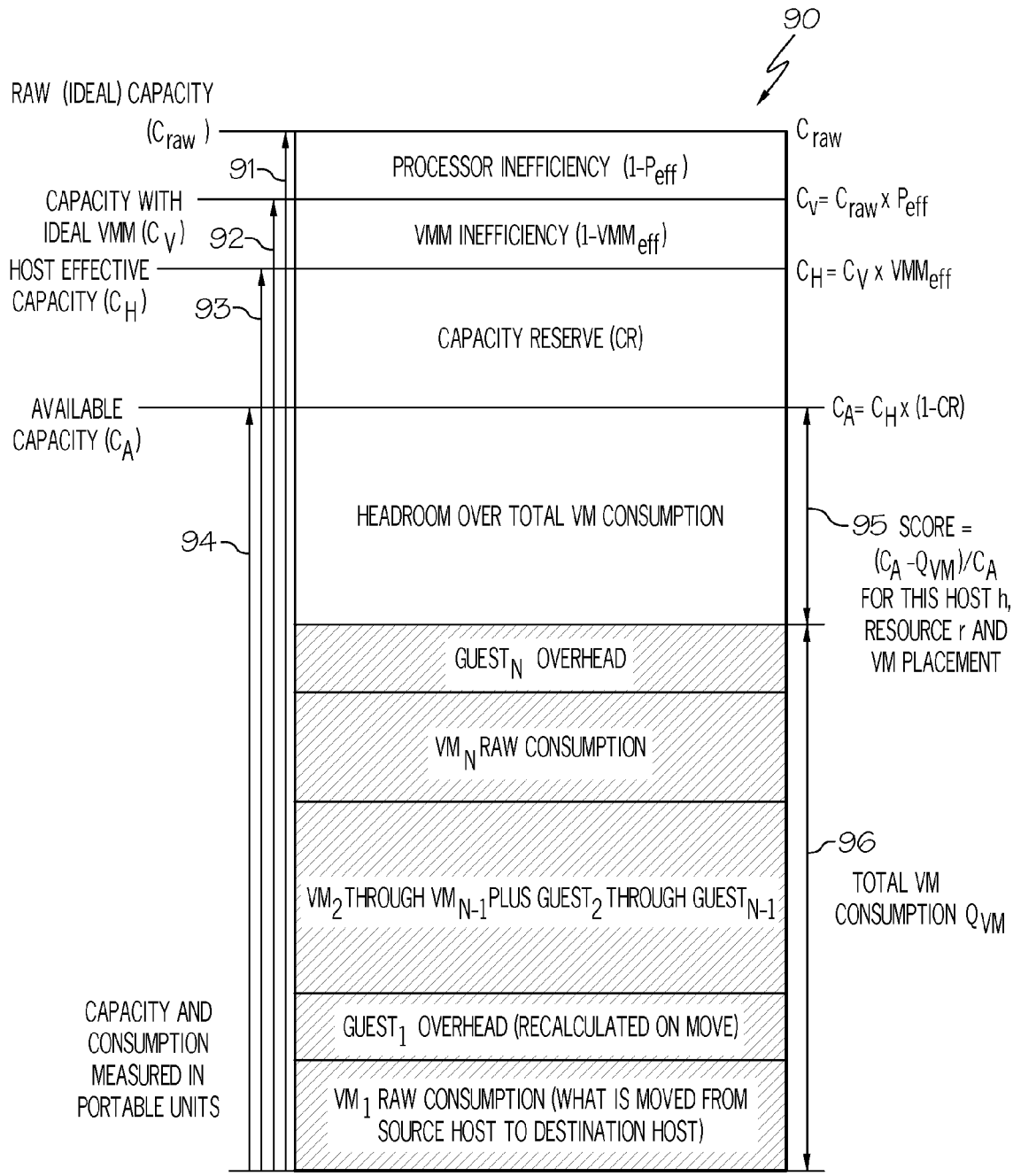
FIG. 4 is a preferred capacity-consumption model indicating available capacity, total VM consumption and a headroom score for a host resource.

Referring to FIG. 4, a capacity-consumption model 90 for a CPU resource on a host is shown. Other types of resources (e.g. memory, network interface) will have similar capacity-consumption models. The host is assumed to operate a set of VMs and include a VMM for that purpose. The CPU resource has a raw capacity 91 of C_RAW. The raw capacity is computed in a set of portable units (TPP for processing resources) for the host as a physical server with an ideal operating system and ideal processor. Practically, the processor efficiency is less than 100% and raw capacity is reduced by a processor efficiency characterized by a percentage Peff. Processor inefficiency occurs due to native operating system overhead and due to additional non-ideal scaling of processor efficiency as a function of processor load due to chip, core and thread contention for shared resources. The VMM also consumes processor threads as a function of the number of VMs and virtual CPUs (VCPUs) configured and further reduces the overall CPU capacity by a percentage VMMeff to an ideal capacity 92 of CV. Host effective capacity 93 is the product of the host raw capacity, the processor efficiency and the VMM efficiency, CH=C_RAW×Peff×VMMeff. However, it is also common to reduce the host effective capacity by a capacity reserve CR, which represents, for example, a potential capacity reduction set aside to accommodate system hardware failures, software failures and unexpected fluctuations in demand. Capacity reserve can vary from resource to resource and from host to host and is user-specified by risk level. The available capacity 94, CA, is the host effective capacity reduced by the capacity reserve: CA=CH(1−CR). The available capacity in FIG. 4 is the total processor capacity available to meet the processing needs of the set of VMs deployed on the host.

"Portable units" are defined as the speed independent service demand per unit time in U.S. Pat. No. 7,769,843 ('843) the disclosure of which is incorporated by reference. The portable unit for CPU resources is referred to herein as total processing power (TPP), which is a generalization of the SPECint_rate benchmark.

As for processor efficiency and VMM efficiency, a suitable OS-chip-core-thread scalability algorithm for computing processor efficiency is the algorithm disclosed in U.S. Pat. No. 7,957,948 ('948) which is also hereby incorporated by reference.

As for the VMs deployed on the host, each VM raw consumption is the raw consumption of CPU resources by a VM excluding guest OS overhead and represented in portable units. The VM raw consumption is the resource consumption that is moved to or from a host during a placement process. VMM efficiency is inherent to the host and is recomputed during placement moves. VM guest OS overhead is unique to each VM and represents the effect of Guest OS scalability on a VM. In practice it is estimated as a function of the virtual processor states for the VM and empirical scalability characteristics of the VM Guest OS. The raw VM consumptions are compensated for VM Guest OS to determine a total VM consumption where the raw VM consumptions for a set of VMs, VM through $VM_N$, deployed on the host and their estimated Guest OS overhead consumptions are all summed together as a total VM consumption 96, $Q_{VM}$, of the available capacity on the host. CPU capacity headroom 95 is total VM consumption 96 subtracted from available capacity 94. For the objective function, CPU capacity headroom 95 is normalized by available resource capacity 94 to a scale of 0 (zero) to 1 (one); $(C_A-Q_{VM})/C_A$, is a metric for establishing a placement score.

Figure 5:
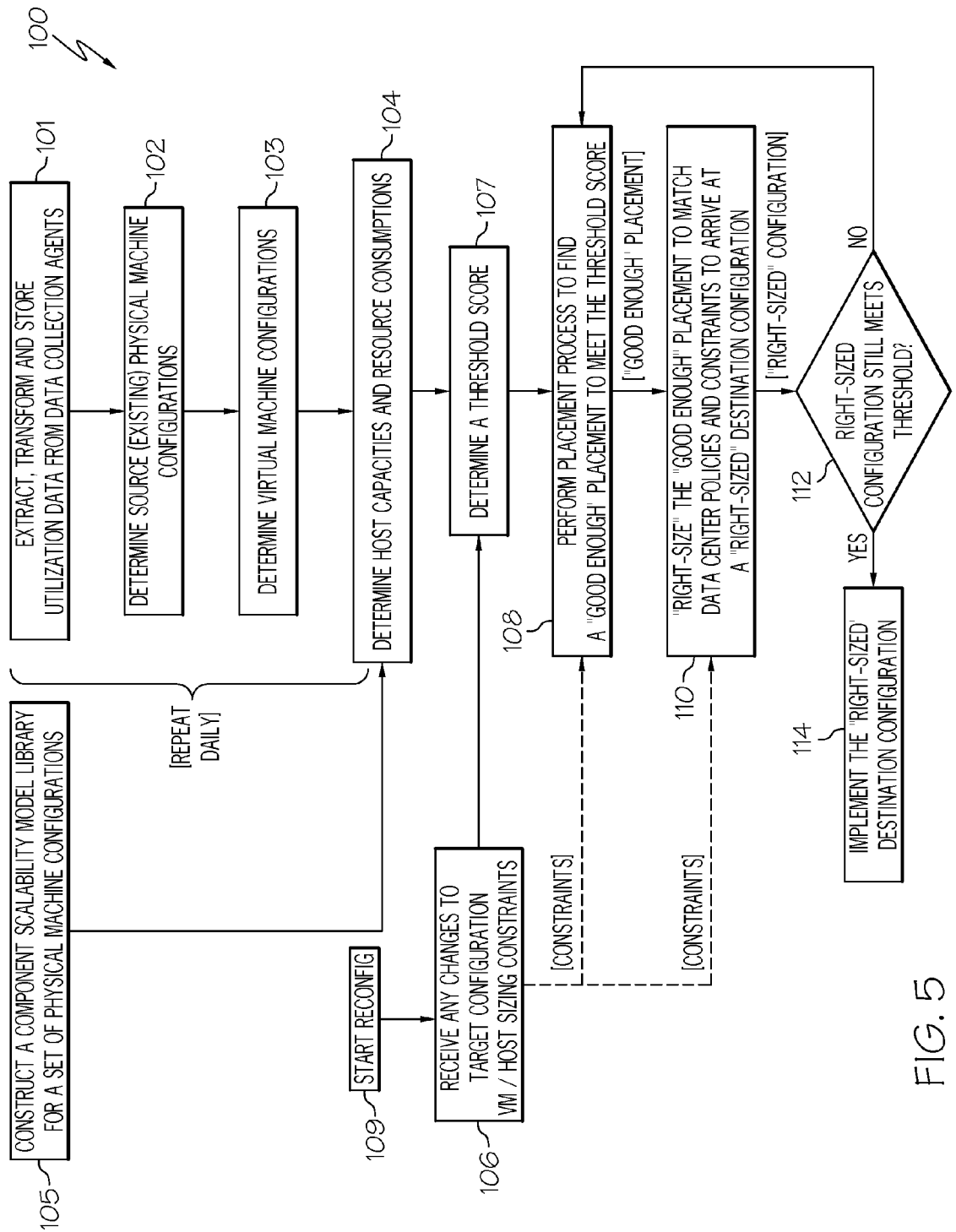
FIG. 5 is a flow chart of a method for optimization and reconfiguration of virtual machines.

Referring to FIG. 5, an embodiment of reconfiguration process 100 is described. Reconfiguration process 100 operates on a source set of physical servers and a source set of VMs associated with a source set of hosts to reconfigure the placement of the VMs on the hosts. Each source host and each source VM has a set of resources associated to it.

At step 101, measurements from the data collection agents are recorded in raw units and stored. The measurements include ordinary utilization of raw physical resources (e.g. CPU, memory, disk, network) by each source physical and virtual machine (for a single machine, virtualization host or cluster or a plurality of machines, virtualization hosts or clusters) organized in small time periods for the long-term past.

At step 102, the method extracts, transforms and stores physical machine configurations (e.g., vendor, machine type and model number, processor type and speed) and physical resource configuration (e.g., number of processor cores, memory, storage and network IO capacities) for each source and existing target physical machine (individual or virtualization host) for each day of the long-term past. A physical machine configuration is stored with a date-time stamp only when the physical machine's configuration changes.

At step 103, the method extracts, transforms and stores virtual machine configurations (e.g., number of virtual CPUs and memory configured) for each source virtual machine for each day of the long-term past. A virtual machine configuration is stored with a date-time stamp only when the virtual machine's configuration changes.

At step 105, a component scalability model library is constructed for a set of physical machine configurations and virtual machine configurations. A mapping is determined for each physical and virtual machine configuration in the source and destination cloud configurations to the corresponding pre-computed entry in a component scalability model library which is used to determine how the physical machine's capacity scales with configuration and load. For example, the component scalability model library is used to determine host effective capacity and available capacity as host effective capacity reduced by a desired capacity reserve. Desired capacity reserve values are provided by the user as an input.

The component scalability model library provides a pre-computed host capacity lookup table that maps a given physical machine configuration and an ordinary utilization directly to a pre-calculated resource capacity consumption in portable units. The total VM consumption is used in a VMM scalability model to compute VMM efficiency. If total VM consumption is unknown for a host, then average VM populations per host are computed as a starting point to estimate VMM efficiency. For resource consumption, the component scalability model library provides a pre-computed resource consumption lookup table that maps a given physical machine configuration and a measured resource utilization directly to a pre-calculated resource consumption in portable units.

In an alternate embodiment, the component scalability model library maps a set of scalability parameters to each machine configuration. In use, a scalability function is called that computes effective capacity based on the machine configuration and the prescribed resource utilization by looking up the set of scalability parameters for the machine configuration and applying the scalability parameters in the computation.

A set of host "templates" suitable for creating target machine configurations is linked to the component scalability model library and specifies details such as the number of processor chips, number of cores, and number of threads, the amount of cache memory per core, the amount of onboard RAM, the amount of onboard disk storage and so forth.

At step 104, referred to as capacity analysis, the method determines, in portable units, the resource capacity of each source physical machine and source host, and the resource consumptions of each VM in the source configuration and the destination configuration in a set of regularized time blocks based on the measured utilizations and on the component scalability library of step 105. Step 104 also provides a set of planning percentile resource consumptions $Q_N(V,R)$ for all the VMs V and resources R along with a set of available capacities $C_A(H,R)$ for all the host servers. Step 104 will be described below in greater detail in reference to FIGS. 7A and 7B.

Steps 101, 102 and 103 are performed on a periodic basis. For example, in step 104, the determination of resource consumptions in portable units in a set of regularized time blocks and the determination of planning percentiles. The determination of available capacities and guest OS overhead are preferably done only in response to step 106, but in some embodiments are also done on a periodic basis. Step 105 is done prior to any of the other steps, but can also be performed as an update at any time. Steps 106, 107 and the following steps are triggered by event 109 that starts a reconfiguration.

Steps 101, 102, 103 and 104 are performed primarily by a set of programmed instructions executed by the consumption analysis server and step 106 and step 105 are performed primarily by a second set of programmed instructions executing on the web server in conjunction with the data warehouse and in communication with the database. Steps 107, 108, 110 and 112 are performed primarily by a third set of programmed instructions executed by the placement server where the results are presented through the web server. Step 114 generally requires direct interaction between the infrastructure management client and the VMMs on the host servers to remove a subset of virtual machines from a list of subset host servers and install the subset of virtual machines on a second subset of host servers. Furthermore, step 114 will install a set of new virtual machines on the host servers.

In an alternate embodiment the first, second and third sets of programmed instructions operate on a single specified physical server. In another alternate embodiment, the first, second and third sets of programmed instructions operate on any one of the consumption analysis server, web server and placement server as needed by the computing environment being managed.

Referring to FIG. 6A, a set of ordinary utilization measurements 70 are collected as in step 101 by data warehouse 16 into database 18 as a set of raw resource data tables VM1(R1), VM2(R1) . . . VMn(R1) . . . VM1(Rm), VM2(Rm) . . . VMn(Rm). Where Rm refers to the mth resource and VM n refers to the nth virtual machine so that the raw resource data table VMn(Rm) includes ordinary resource utilization measurements for the mth resource consumed by the nth virtual machine. Each set of ordinary utilization measurements are collected at set of short sample times (e.g. accumulating every 5 or every 15 minutes) during each day for a history of days (e.g. 90 days).

Generally, the data collection agents are not synchronized nor are the sample time intervals for measurements consistent. The ordinary utilization measurements (cell values) can be an average over the sample time interval, a peak over the sample time interval, a sum over the sample time interval or any other meaningful measurement provided the meaning of each measurement is also collected by the data warehouse and stored with the set of utilization measurements. An example of an ordinary utilization measurement is an average of 50% for a CPU configuration between 10:00 and 10:15 hours, where if the CPU configuration has 32 processors, 50%, or 16 of the processors, were busy between 10:00 and 10:15 hours.

Returning to FIG. 5, a target configuration is confirmed at step 106 and any threshold constraints, placement constraints, VM right-sizing, host right-sizing and cluster sizing constraints are recorded for use during the remainder of reconfiguration process 100. The target configuration can be accepted as the existing configuration. Otherwise, additional hosts and VMs can be added or deleted. If additional hosts and VMs are added, then a scalability model is identified for the additional hosts and VMs using the set of host templates and a set of VM templates from the component scalability library. The initial host capacities and VM resource consumptions of the additional hosts and additional target VMs are determined as in step 104. Cluster sizing constraints can be checked at this step or preferably at step 107 to determine if host(s) need to be deleted and their existing VMs orphaned for placement onto other hosts.

In an alternate embodiment, step 106 is extended to include a scenario analysis where a target configuration is hypothetical. Examples of possible scenario analyses include workload forecasting, new cloud based application deployments, removing or adding a data center in a data center consolidation analysis and general user specified hyptothetical scenarios that alter an existing cloud configuration. A further example of a user specified hypothetical scenario is to increase the VM resource consumptions over the existing VM resource consumptions by a scaling factor representing, for example, the change in consumption resulting from installation of a new version of application software. The scaling factor is applied to the existing VM resource consumptions to arrive at set of scaled VM resource consumptions and propose a target placement to accommodate the set of scaled VM resource consumptions.

Examples of threshold constraints are (1) an adjustable risk parameter that sets the planning percentile level and (2) a fractional parameter that determines what fraction of an ideal score to set the threshold.

At step 107, a threshold score is determined. From FIG. 4, a placement score is related to a headroom between capacity and consumption. The input to step 107 is the target configuration including a target set of hosts with associated host capacities and a target set of VMs with associated VM resource consumptions. The placement score is generally and preferably computed as the minimum normalized headroom in a cloud computing environment across all resources, all time intervals, all hosts and all clusters. If the optimal placement and an achievable score were known, then the threshold score could be computed from the achievable score. However, it is not practical to find the optimal placement. Instead, an ideal score is calculated from an aggregate "headroom" as MIN(1−Qtot/Ctot) where Ctot is the total available capacity of the target set of hosts and Qtot is the total VM resource consumption over the target set of virtual machines for each resource. The aggregate value (1−Qtot/Ctot) is the normalized difference between Ctot and Qtot, normalized by dividing the difference between the total available capacity and the total VM resource consumption by the total available capacity. The minimum is taken over the set of hosts and the set of resources and the defined set of time intervals. The threshold score is taken as a pre-configured fraction of the ideal score.

The ideal score represents the "smooth" spreading of all resource consumptions by all VMs across all hosts proportional to the available capacities of those hosts. However, when a set of VMs are placed on a set of hosts, even when placed as uniformly as possibly, a variation naturally results in the headroom of each host due to the "chunky" nature of the VM sizes and host capacities, that is their different consumption requirements on different resources in different capacity environments, and the requirement to place all the resource consumptions by a particular VM on the same host. So, the ideal placement is typically unachievable but the ideal score is a useful upper bound for computing the threshold score. The threshold scoring method of step 107 is described in more detail below in relation to FIG. 8. There is also a pseudocode listing for an alternate embodiment of threshold scoring step 107 in pseudocode listing of FIGS. 17A and 17B.

At step 108, the placement process is executed to determine a new placement to determine a new placement. In an embodiment of the present disclosure, the mode of operation of placement process 108 is user selectable by the web server. The input to the placement process is the target configuration including a target set of hosts with associated host capacities and a target set of VMs with associated VM resource consumptions, along with any constraints from step 106, the threshold score from step 107. Step 108 finds a placement that is "good enough" to meet the threshold score and reports the "good enough" placement. During the placement process, only candidate placements that satisfy all placement constraints are considered. The placement process of step 106 is described in more detail below in relation to FIGS. 10A, 10B, 10C and 10D and pseudocode listings 14-16, 17A, 17B and 18.

At step 110, a final right-sizing process is executed. The "good enough" placement from step 108 is converted to a "right-sized" placement that matches all data center, VMM and industry standard policies, VM constraints and host constraints. All clusters, hosts, VMs and resources are considered in step 110. For example, the "good enough" placement may have resulted in a VM that is configured with insufficient virtual resources to meet its consumption. In this case, the VM is right-sized with adequate virtual resources. The right-sizing process of step 110 is described in more detail below in relation to FIG. 9.

At step 112, a score is determined for the "right-sized" configuration. If the score is less than the threshold score, then step 108 is repeated to find another placement based on the "right-size" configuration. Step 108 adjusts the "right-sized" placement and re-scores it to find a better placement. If the score is greater than the threshold score, then step 114 is performed to implement the "right-sized" placement in the cloud configuration by reconfiguring the associated hosts, clusters and data centers to match the "right-sized" placement.

Figure 7A:
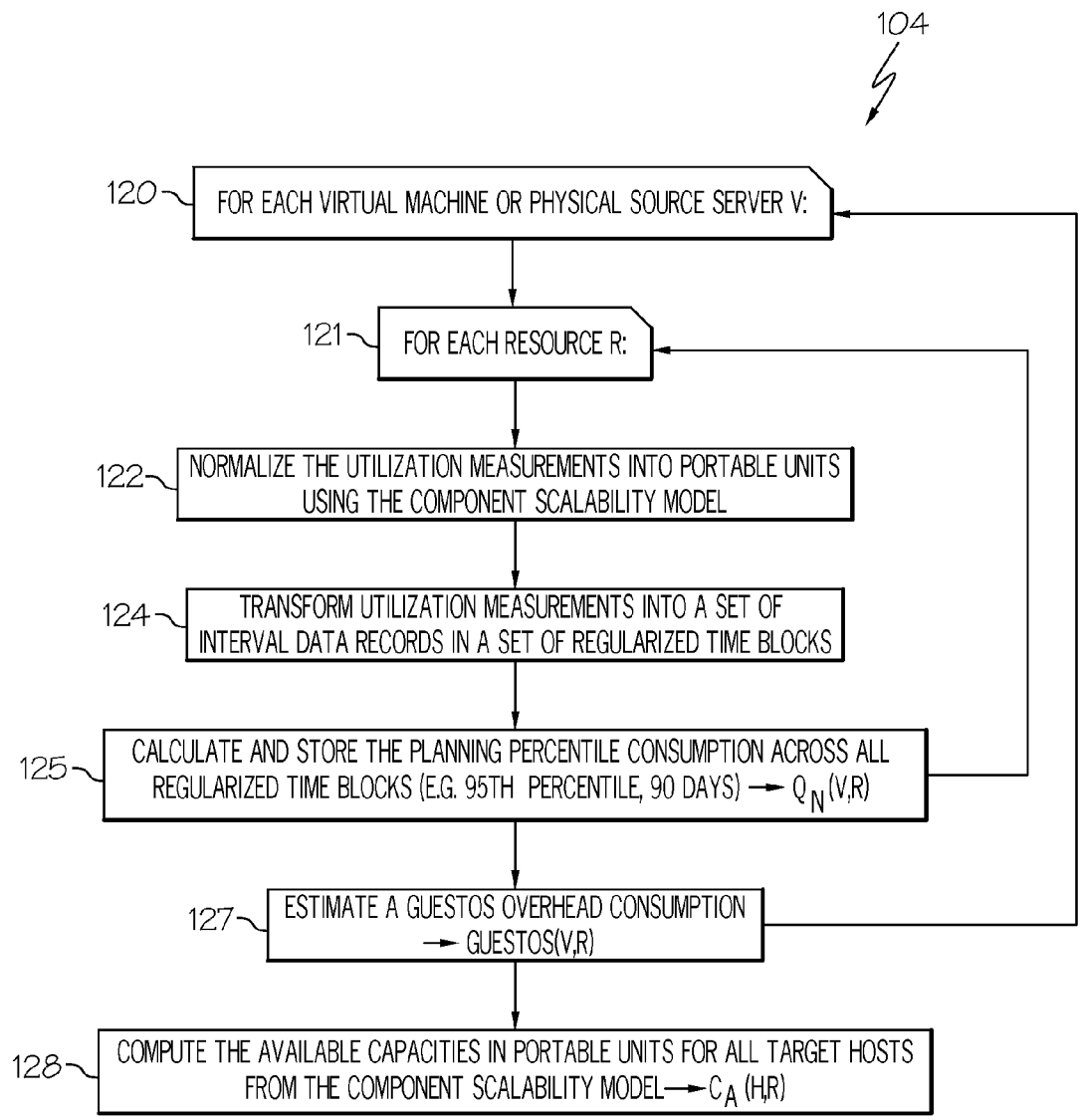
FIG. 7A is a flow chart of a pre-processing method.

FIG. 7A describes an embodiment of step 104. At steps 120 and 121 the following steps are repeated for each resource in each virtual machine and physical server in the set of VMs and the set of physical servers.

At step 122, the resource consumption (in portable units) of a given resource is determined for a given machine configuration V (virtual or physical server) during a set of sample time intervals. A highly efficient embodiment of step 122 is accomplished by mapping a measured ordinary utilization and the given machine configuration into resource consumption for the given resource by looking up the given machine configuration and the measured ordinary utilization in the pre-computed resource consumption lookup table from step 105. A highly precise embodiment of step 122 is accomplished by performing a functional mapping as described in reference to step 105.

Since the data collection agents are not synchronized nor are the sample time intervals for ordinary utilization measurements consistent, the resource consumptions from step 122 are also not synchronized and are associated with irregular sample times. The resource consumptions are then regularized into a set of regularized time blocks where a regularized time block is prescribed for all resources, virtual machines and physical machines, synchronized to a single clock and characterized by a pre-defined period of time. At step 124, the resource consumptions are first broken up, regularized and stored into the database as a set of interval data records.

The interval data records are formed one of several possible methods. In a first, when a subset of utilization data values is reported in a set of sample times within one regularized time block, the subset of utilization data values is aggregated, for example, by averaging the subset of utilization data values. In a second method, if two or more utilization data values reported at two or more sample times overlap with a single regularized time block, then a weighted averaging of the utilization data values is performed. In a third method, if there are multiple regularized time blocks for one utilization data value reported in one sample time, then the utilization data value is divided amongst the multiple regularized time blocks.

In an embodiment of step 125, the set of interval data records for a long-time past time period, each resource R and each VM (or physical server) V are analyzed as a group. For example, all regularized time blocks are grouped in each day for the last 30 days. Then a planning percentile of VM resource consumption is computed for the group (e.g. 95th percentile) and stored as an aggregate resource consumption $Q_N(V,R)$.

At step 127, a guest OS overhead consumption GuestOS (V,R) is estimated for each resource R on each virtual machine V. A simplifying assumption is made in that the guest OS overhead is constant across the set of VMs, regardless of host placement. In an alternate embodiment, the guest OS is computed for each VM in the set of VMs according to the host placement.

At step 128, the method determines the resource capacities comprising: raw capacity, ideal capacity, host effective capacity and available capacity in portable units for a resource R and host H. Step 128 is accomplished by mapping the total VM consumption for host H and the given machine configuration into a resource capacity $C_A(H,R)$ for the given resource by looking up the given machine configuration and the total VM consumption in the pre-computed host capacity lookup table from step 105. In other embodiments, a functional mapping is performed as described in step 105. The determination of resource capacity is done only for source virtual and physical machines whose configurations have changed during the long-term past.

Figure 7B:
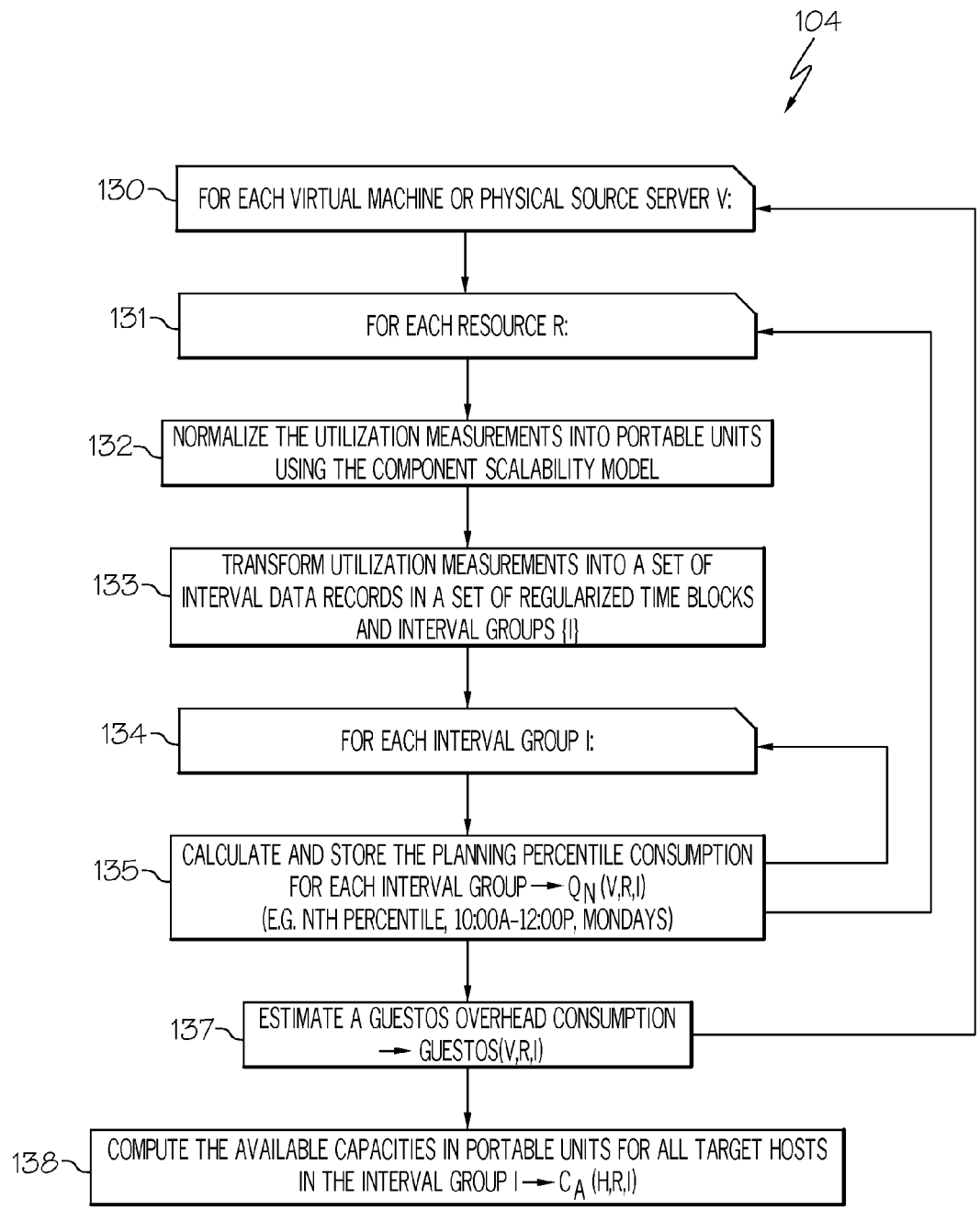
FIG. 7B is a flow chart of a pre-processing method.

FIG. 7B describes an embodiment of step 104. At steps 130 and 131 the following steps are repeated for each resource R in each virtual machine and physical server V in the set of VMs and the set of physical servers.

At step 132, the resource consumption (in portable units) of a given resource is determined for a given machine configuration V (virtual or physical server) during a set of sample time intervals. A highly efficient embodiment of step 132 is accomplished by mapping a measured ordinary utilization and the given machine configuration into resource consumption for the given resource by looking up the given machine configuration and the measured ordinary utilization in the pre-computed resource consumption lookup table from step 105. A highly precise embodiment of step 132 is accomplished by performing a functional mapping as described in reference to step 105.

Since the data collection agents are not synchronized nor are the sample time intervals for ordinary utilization measurements consistent, the resource consumptions from step 122 are also not synchronized and are associated with irregular sample times. The resource consumptions are then regularized into a set of regularized time blocks where a regularized time block is prescribed for all resources, virtual machines and physical machines, synchronized to a single clock and characterized by a pre-defined period of time. At step 124, the resource consumptions are first broken up, regularized and stored into the database as a set of interval data records. At step 133, the resource consumptions are first broken up, regularized and stored into the database as a set of interval data records.

In an embodiment, the interval data records are formed by one of several possible methods. In a first method, when a subset of utilization data values is reported in a set of sample times within one regularized time block, the subset of utilization data values is aggregated, for example, by averaging the subset of utilization data values. In a second method, if two or more utilization data values reported at two or more sample times overlap with a single regularized time block, then a weighted averaging of the utilization data values is performed. In a third method, if there are multiple regularized time blocks for one utilization data value reported in one sample time, then the utilization data value is divided amongst the multiple regularized time blocks.

In an embodiment, at step 133, the set of interval data records are also grouped, tagged and stored in the database as a set of interval groups with a set of group identifiers {I}. For example, all thirteen of "Friday 5:00 pm-6:00 pm" regularized time blocks from every week over the last 90 days are grouped together into an interval group and each of the corresponding interval data records are tagged with a group identifier 0. In another example, all thirty of "9:00 am-10:00 am" regularized time blocks and all thirty of the "10:00 am-11:00 am" regularized time blocks over the last 30 days are grouped together into an interval group and each of the corresponding interval data records are tagged with a group identifier.

Step 134 begins a loop which iterates step 135 for each interval group. At step 135, a planning percentile of VM resource consumption for each interval group is computed (e.g. 75th percentile) and stored as the aggregate group resource consumption $Q_N(V,R,I)$ associated with the group identifier 0.

At step 137, a guest OS overhead consumption GuestOS (V,R,I) is estimated for each resource R on each virtual machine V in each interval group I. In an embodiment, a simplifying assumption is made in that the guest OS overhead remains constant across the set of VMs, regardless of host placement: GuestOS(V,R,I)=GuestOS(R).

At step 138, the method determines the resource capacities comprising: raw capacity, ideal capacity, host effective capacity and available capacity in portable units for a resource R and host H in an interval group I. Step 138 is accomplished by mapping the total VM consumption for host H and the given machine configuration into a resource capacity $C_A(H,R,I)$ for the given resource and interval group by looking up the given machine configuration and the total VM consumption in the pre-computed host capacity lookup table from step 105. In other embodiments, a functional mapping is performed as described in step 105. In an embodiment, the determination of resource capacity is done only for source virtual and physical machines whose configurations have changed during the long-term past.

Referring to FIG. 6B, the set of ordinary utilization measurements from FIG. 6A are converted to set of resource consumptions 72 in portable units as in steps 132 and 133. The set of resource consumptions 72 are for a virtual machine labeled VM-2 having a configuration identifier "859" and are presented in portable units of TPP (total processing power). The configuration identifier "859" matches a configuration identifier for a VM configuration in the component scalability library. Set of resource consumptions 72 have been converted as in step 104 to a set of regularized time blocks which are presented as a set of interval data records in rows 74. Set of resource consumptions 72 are further organized into sample periods which are presented as columns 73. A sample period can be ascribed to a variety of time periods. For example, sample period 1 could be a day, a week, a month, 6 hour periods, historical periods such as every Monday in the last three months and so forth.

Referring to FIG. 6B, a set of percentiles is shown as computed as in step 135. For example, a cell of column 76 shows a calculated 65th percentile, calculated across the sample periods of columns 73 for a regularized time block in a row. Similarly, column 77 is a set of calculated 75th percentiles, column 78 is a set of calculated 85th percentiles and column 79 is a set of calculated 95th percentiles.

When regularized time blocks are grouped by tagging into a set of interval groups, a cell in column 76 is a calculated 65th percentile, calculated across tagged cells of columns 73 for the regularized time blocks in the corresponding row. The cells of columns 77, 78 and 79 represent an Nth percentile calculated on an interval group. As an example, a first interval group could be defined for regularized "interval 2" including sample periods 1, 8, 15 and 21. As a further example, a second interval group could be defined for regularized "interval 2" including sample periods 2-3, 9-10, 16-17 and 22-23 and the percentiles computed and stored in another set of columns which are not shown in FIG. 6B.

Referring to FIG. 6C, table 80 is shown. A set of percentiles for N virtual machines is shown in FIG. 6B, columns 76, 77, 78 and 79 for the set of virtual machines {VM-1, VM-2, . . . VM-N} wherein the columns 83 contain percentile values for individual virtual machines in set of rows 84, where each row in set of rows 84 represents an interval group.

Figure 8A:
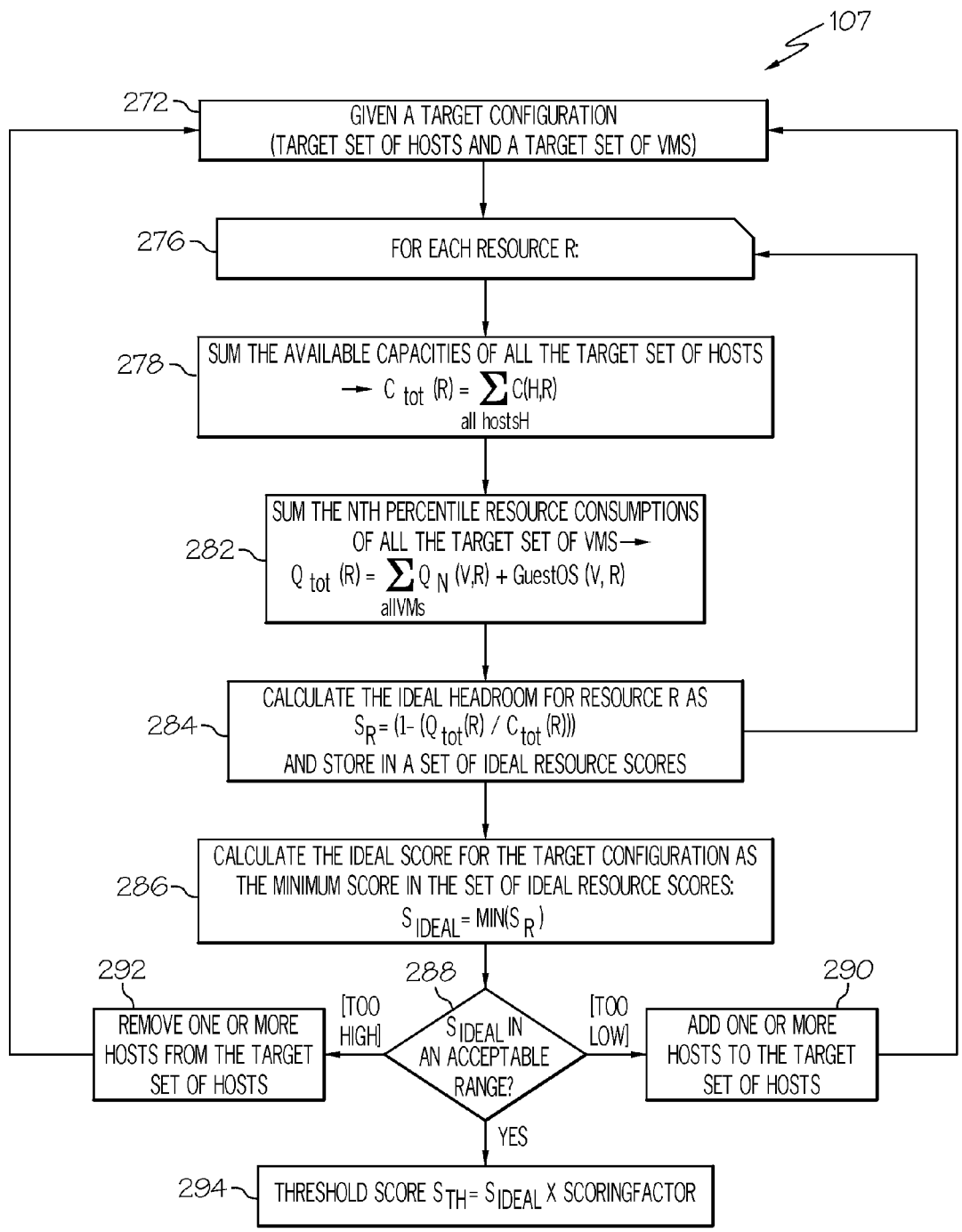
FIG. 8A is a flow chart of a method to determine a threshold score.

Referring to FIG. 8A, an embodiment of the threshold scoring method of step 107 (FIG. 5) is provided. At step 272, a target configuration is provided defining a target set of hosts and a target set of VMs to be placed on the target set of hosts. At step 276, steps 278, 282 and 284 are iterated over all resources.

At step 278, the sum of available capacities for the resource R for all of the target set of hosts is computed as:

$$C_{tot}(R) = \sum_{\substack{all\ target \\ hosts\ H}} C_A(H, R)$$

At step 282, the sum of the Nth percentile resource consumptions for the resource R for all of the target set of VMs is computed as:

$$Q_{tot}(R) = \sum_{\substack{all\ target \\ VMs\ V}} Q_N(V, R) + GuestOS(V, R)$$

At step 284, the ideal headroom $S_R$ for resource R is computed as the percentage difference:

$$S_R = 1 - \frac{Q_{tot}(R)}{C_{tot}(R)}$$

The ideal headroom is then stored in a set of ideal resource scores. Threshold scoring method 107 then repeats at step 278 until all ideal headrooms are computed and stored for all resources.

At step 286, the ideal score for the target configuration is computed as the minimum score in the set of ideal resource scores: $S_{Ideal}=MIN_R(S_R)$. At step 288, a condition for adding or removing hosts is checked. If in step 288, the ideal score is within a pre-defined range [$S_{LOW}$, $S_{HIGH}$], then a threshold score is computed at step 294 by multiplying the ideal score by a scoring factor SF as: $S_{Th}=S_{IDEAL}\times SF$.

If the ideal score $S_{IDEAL}$ is less than $S_{LOW}$, then step 290 is performed and one or more host servers are added to the target set of hosts. In an embodiment $S_{LOW}=0$ (zero). At step 290, the number of additional hosts having a host resource capacity of $C_{host}(R)$ is computed according to the formula:

$$NHostsAdd = CEIL\left(MAX_R\left(\frac{|Q_{tot}(R) - C_{tot}(R)|}{SF \cdot C_{host}(R)}\right)\right).$$

In an embodiment for handling excess capacity, a user specifies a minimum capacity $M_{Spare}$ to be available as spare host capacity and a threshold host capacity to remove, $M_{Remove}$ in units of host capacity $C_{host}(R)$. A number of hosts to remove NHostsRemove is computed at step 288 and compared to $M_{Remove}$. If NhostsRemove is greater than $M_{Remove}$, then step 292 is performed and NhostRemove host servers are removed from the target set of hosts. The number of hosts to be removed is computed according to the formula:

$$NHostsRemove = FLOOR\left(MIN_R\left(\frac{C_{tot}(R) - Q_{tot}(R)}{C_{host}(R)}\right) - \frac{M_{spare}}{SF}\right).$$

In an alternate embodiment, $S_{HIGH}$ can be estimated from:

$$S_{HIGH} = MIN_R\left(\left(M_{Remove} + \frac{M_{Spare}}{SF}\right)\frac{C_{host}(R)}{C_{tot}(R)}\right),$$

and compared to $S_{IDEAL}$ at step 288. If $S_{IDEAL}$ is greater than $S_{HIGH}$ then step 292 is performed.

Figure 8B:
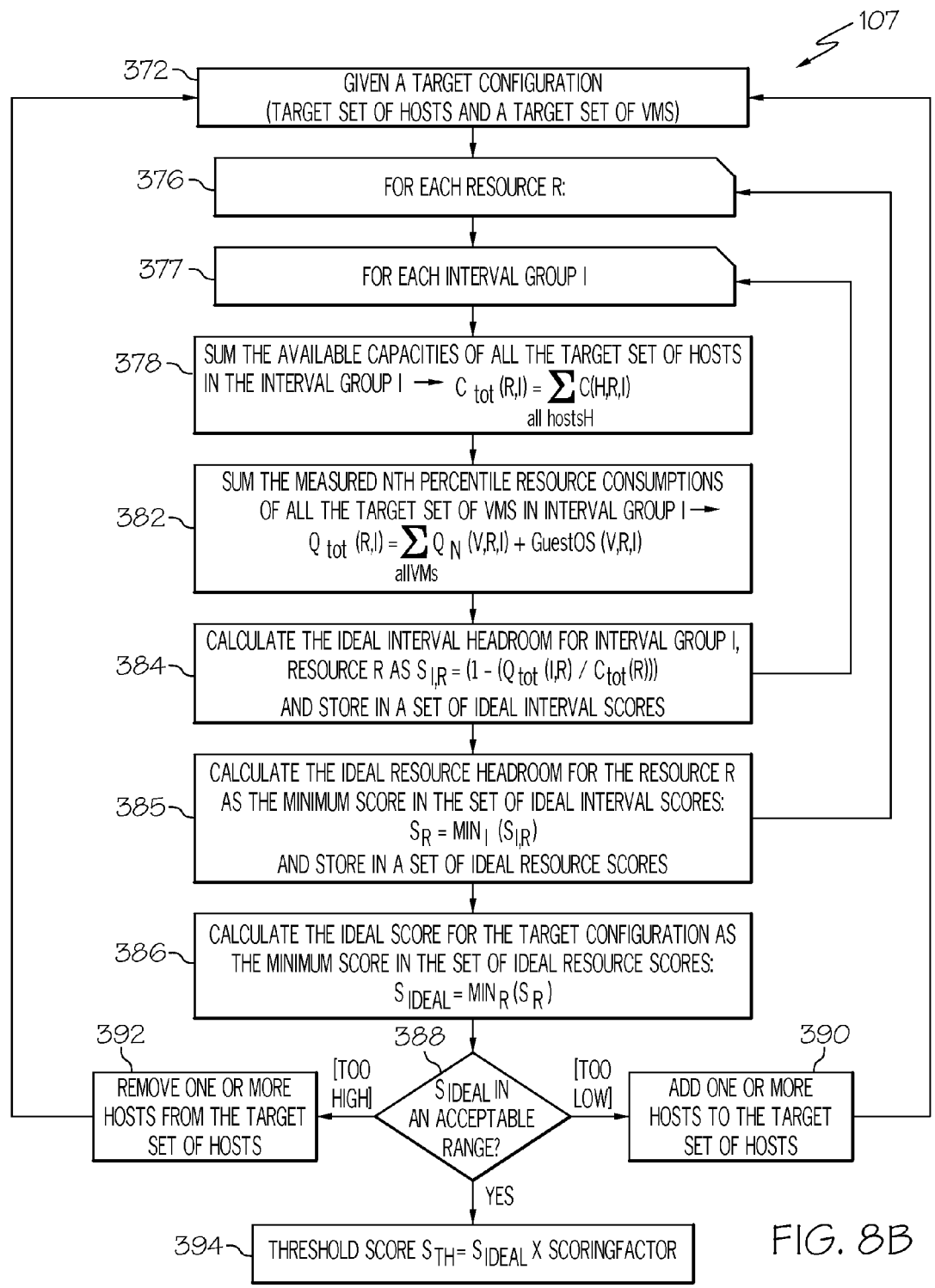
FIG. 8B is a flow chart of a method to determine a threshold score.

Referring to FIG. 8B, an embodiment of the threshold scoring method of step 107 (FIG. 5) is provided. At step 372 a target configuration is provided defining a target set of hosts and a target set of VMs to be placed on the target set of hosts. At step 376 steps 377, 378, 382, 384 and 385 are iterated over all resources. At step 377, steps 378, 382 and 384 are iterated over all intervals.

At step 378, the sum of available capacities for the resource R in the interval I for all of the target set of hosts is computed as:

$$C_{tot}(R, I) = \sum_{\substack{all\ target \\ hosts\ H}} C_A(H, R, I)$$

At step 382, the sum of the Nth percentile resource consumptions for the resource R in the interval I for all of the target set of VMs is computed as:

$$Q_{tot}(R, I) = \sum_{\substack{all\ target \\ VMs\ V}} Q_N(V, R, I) + GuestOS(V, R, I)$$

At step 384, the ideal interval headroom $S_{R,I}$ for interval I and resource R is computed as:

$$S_{R,I} = 1 - \frac{Q_{tot}(R, I)}{C_{tot}(R, I)}$$

The ideal interval headroom is then stored in a set of ideal interval scores. The threshold scoring method then repeats at step 377 until all ideal interval headrooms are computed for the resource R and stored in the set of ideal interval scores.

At step 385, the ideal resource score for the target configuration is computed as the minimum score in the set of ideal interval scores: $S_R=MIN_I(S_{R,I})$. The threshold scoring method then repeats at step 376 until all ideal resource scores are computed and stored.

At step 386, the overall ideal score for the target configuration is computed as the minimum score in the set of ideal resource scores: $S_{IDEAL}=MIN_R(S_R)$. At step 388, a condition for adding or removing hosts is checked. If at step 388, the ideal score is within a pre-defined range [$S_{LOW}$, $S_{HIGH}$], then a threshold score is computed at step 394 by multiplying the ideal score by a scoring factor SF as: $S_{Th}=S_{IDEAL}\times SF$.

If the ideal score $S_{IDEAL}$ is less than $S_{LOW}$, then step 390 is performed and one or more host servers are added to the target set of hosts. In an embodiment $S_{LOW}=0$ (zero). At step 390, the number of additional hosts having a host resource capacity of $C_{host}(R)$ is computed according to the formula:

$$NHostsAdd = \text{CEIL}\left(\text{MAX}_R\left(\frac{|Q_{tot}(R) - C_{tot}(R)|}{SF \cdot C_{host}(R)}\right)\right).$$

In an embodiment for handling excess capacity, a user specifies a minimum capacity $M_{Spare}$ to t be available as spare host capacity and a threshold host capacity to remove, $M_{Remove}$ in units of host capacity $C_{host}(R)$. A number of hosts to remove NHostsRemove is computed at step 388 and compared to $M_{Remove}$. If NhostsRemove is greater than $M_{Remove}$, then step 392 is performed and NhostRemove host servers are removed from the target set of hosts. The number of hosts to be removed is computed according to the formula:

$$NHostsRemove = \text{FLOOR}\left(\text{MIN}_R\left(\frac{C_{tot}(R) - Q_{tot}(R)}{C_{host}(R)}\right) - \frac{M_{spare}}{SF}\right).$$

In an alternate embodiment, $S_{HIGH}$ can be estimated from:

$$S_{HIGH} = \text{MIN}_R\left(\left(M_{Remove} + \frac{M_{Spare}}{SF}\right)\frac{C_{host}(R)}{C_{tot}(R)}\right),$$

and compared to $S_{IDEAL}$ at step 388. If $S_{IDEAL}$ is greater than $S_{HIGH}$ then step 392 is performed.

In an alternate embodiment, if NHostsRemove is greater than or equal to M, then step 392 is preformed. If a set of hosts need to be removed, a dialogue is presented by the web server indicating that a host server needs to be removed, the dialogue further providing a tool to select a host server to remove from the target set of hosts.

Figure 9A:
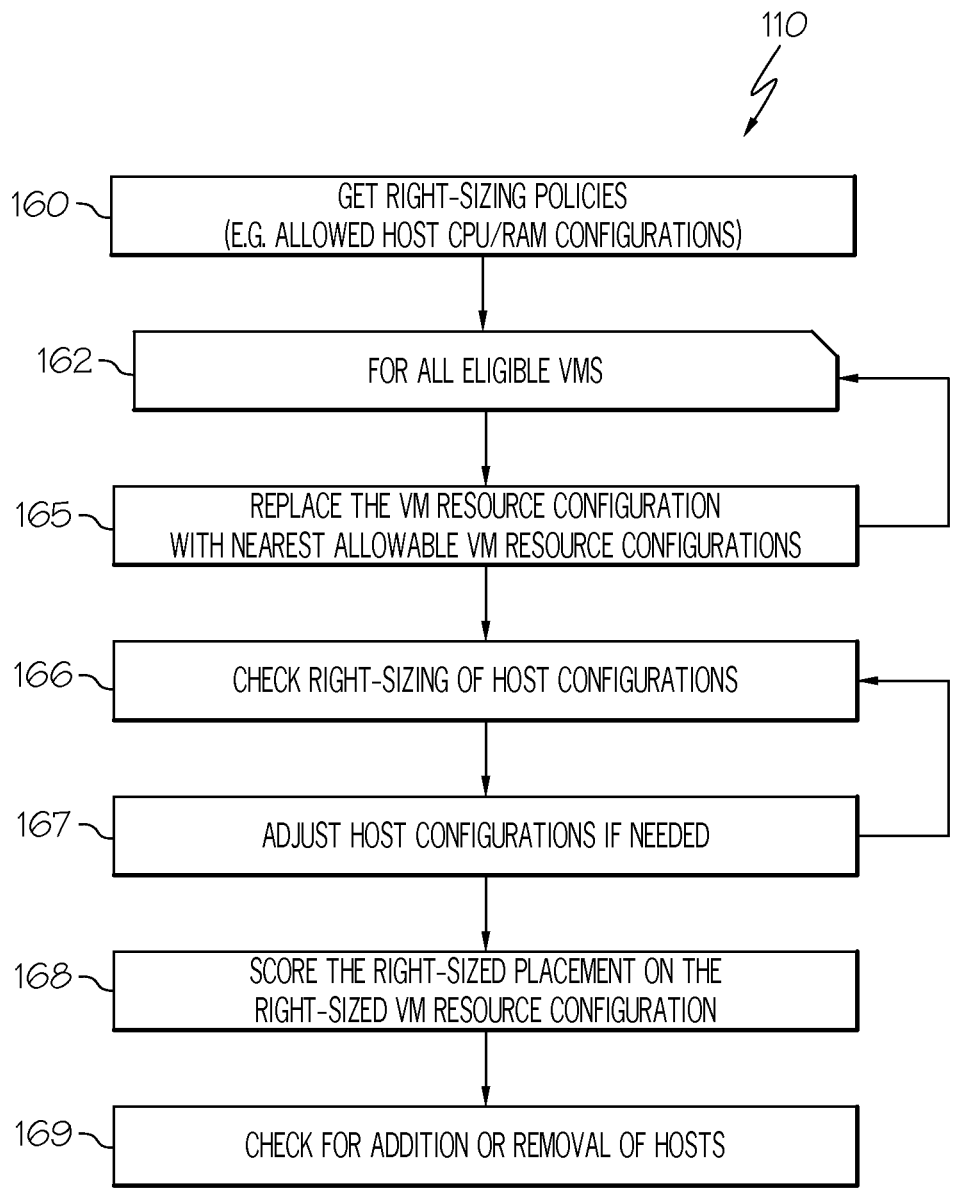
FIG. 9A is a flow chart of a right-sizing method.

Referring to FIG. 9A, an embodiment of the final right sizing process in step 110 (FIG. 5) is shown. At step 160, a set of right-sizing policies are received. The set of right sizing policies preferably include an allowed set of host configurations and allowed set of VM configurations and are specified in the set of host templates and the set of VM templates in the component scalability library. Each virtual machine (VM) has a resource configuration describing the required VCPUs, virtual RAM, and so forth. Virtual machine monitors and virtual machine tools from various vendors, as well as industry standards dictate a defined set of resource configurations.

At step 162, the step 165 is repeated for all eligible virtual machines where "eligible" is a user selectable parameter. The "eligible" parameter is specified by the user and can include several potential conditions. In a first case, the parameter is set to "none." In this case, right-sizing is never performed. In a second case, the parameter is set so that only VMs that were moved during the placement process are eligible for right-sizing. In a third case, all VMs are eligible for right-sizing.

At step 165, a VM configuration returned from the placement process is reconfigured with a "nearest allowable" VM configuration that is also a right-sized VM configuration. The "nearest allowable" VM configuration can be determined by selecting from a fixed set of VM size constraints, by applying a set of VM sizing rules to the existing VM configuration or by a combination of selecting from the fixed set of VM size constraints and applying the set of VM sizing rules.

In a first example of determining "nearest allowable" VM configuration, a size constraint is applied to a first VM where the size constraint is selected from the fixed set of VM size constraints based on the VM size needed for the regularized time block of the first VM's greatest consumption.

In a second example of determining "nearest allowable" VM configuration, a size constraint is applied to a second VM where the size constraint is selected from the fixed set of VM size constraints based on the second VM's Nth percentile VM resource consumption. In the second example, the second Nth percentile VM resource consumption used for right-sizing can be the same or different than the Nth percentile VM resource consumption used in the scoring process where N ranges from 50 to 100.

In an embodiment of step 166, the second example is implemented where the Nth percentile VM resource consumption used for right-sizing is larger than the Nth percentile VM resource consumption used in scoring (e.g. scoring uses $75^{th}$ percentiles, right-sizing uses $85^{th}$ percentiles) and the second Nth percentile VM resource consumption is computed across all regularized time blocks over a long time period.

In a third example of determining "nearest allowable" VM configuration, a size constraint is applied to a third VM where the size constraint is calculated by multiplying the third VM existing resource consumption by a pre-defined inflation factor to arrive at a computed VM resource consumption and then taking the mathematical ceiling of the computed VM resource consumption to specify a minimum resource consumption for the third VM. For example, given an existing VM consumption of processing power is 2.9 VCPU and the pre-defined inflation factor is selected as 1.25, the processing power is multiplied by a pre-defined inflation factor and taking the ceiling results in a specification of 4.0 VCPU for a "nearest allowable" VM configuration.

In a fourth example of determining "nearest allowable" VM configuration, a size constraint is applied to a fourth VM where the size constraint is calculated by multiplying a fixed VM constraint from the fixed set of VM constraints by a pre-defined inflation factor to arrive at a computed VM resource consumption and then taking the mathematical ceiling value of the computed VM resource consumption to specify the resource configuration. In a more detailed example of the third example, suppose an existing VM consumption of processing power is 2.9 VCPU and the pre-defined inflation factor is selected as 1.25. Multiplying the processing power by the pre-defined inflation factor and taking the ceiling results in a specification of 4.0 VCPU for a "nearest allowable" VM configuration.

After all eligible VMs have been replaced, the reconfigured placement may not be right-sized at the host level. At step 166, the hosts are checked in the reconfigured placement against right-sizing constraints such as the allowed set of host configurations. For example, a host level right-sizing constraint is the number of VCPUs allowed in a host configuration. If after step 166, the number of VCPUs exceeds the host level right-sizing constraint, then at least one VM should be moved.

At step 167, any necessary adjustments are made to the host configurations including VM placement. Steps 166 and 167 are then repeated for a pre-determined number of iterations in order to avoid excessive looping. In an embodiment steps 166 and 167 are performed only once.

The result of steps 165, 166 and 167 is a "right-sized" placement. At step 168, a placement score $S_P$ is computed for the "right-sized" placement according to the scoring process of FIGS. 11A and 11B.

Figure 9B:
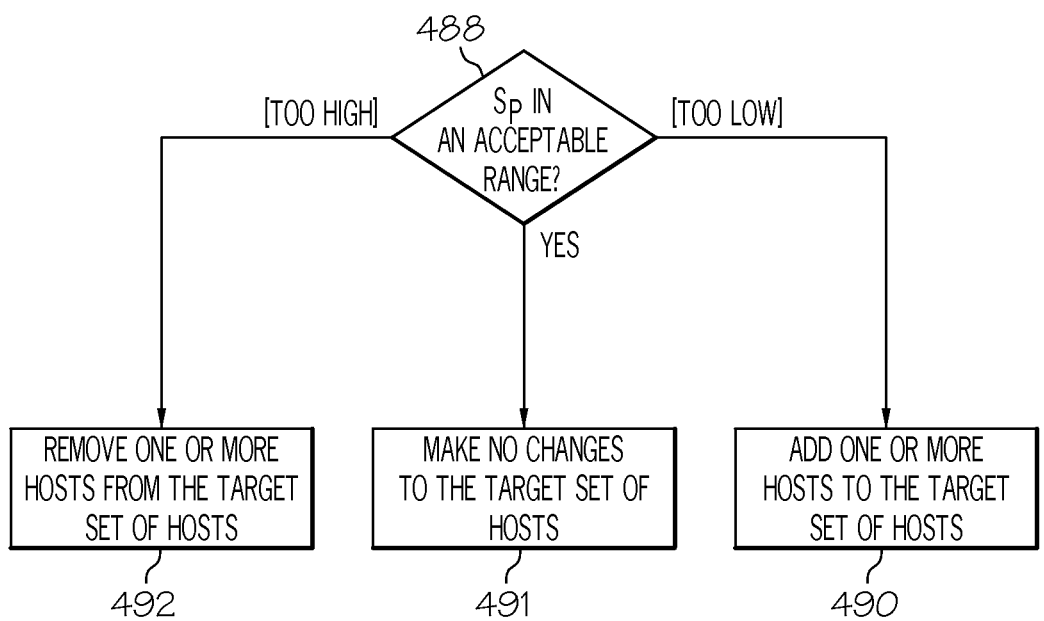
FIG. 9B is a flow chart of a right-sizing check for a placement.

At step 169, a check is performed to add or remove hosts from the target configuration as shown in FIG. 9B.

Referring to FIG. 9B, at step 488, a condition for adding or removing hosts is checked. If the ideal score is within the pre-defined range [$S_{LOW}$, $S_{HIGH}$], then the process moves to step 491. At step 491, no changes are made to the target set of hosts. If the placement score $S_P$ is less than $S_{LOW}$, then step 490 is performed. At step 490, one or more host servers are added to the target set of hosts. In an embodiment $S_{LOW}=0$ (zero). At step 490, the number of additional hosts having a host resource capacity of $C_{host}(R)$ is computed according to the formula:

$$NHostsAdd = \text{CEIL}\left(\text{MAX}_R\left(\frac{|Q_{tot}(R) - C_{tot}(R)|}{SF \cdot C_{host}(R)}\right)\right),$$

where $Q_{tot}(R)$ is the total resource consumption of the target set of VMs, $C_{tot}(R)$ is the total available capacity of the target set of hosts for a resource R and $C_{host}(R)$ is the total available capacity of a new host. In an alternate embodiment, $C_{host}(R)$ represents an average available capacity over several host types configured in a predefined way.

In an embodiment for handling excess capacity, a user specifies a minimum capacity $M_{Spare}$ to be available as spare host capacity and a threshold host capacity to remove, $M_{Remove}$ in units of host capacity $C_{host}(R)$. A number of hosts to remove NHostsRemove is computed at step 488 and compared to $M_{Remove}$. If NhostsRemove is greater than $M_{Remove}$, then step 492 is performed and NhostRemove host servers are removed from the target set of hosts. The number of hosts to be removed is computed according to the formula:

$$NHostsRemove = \text{FLOOR}\left(\text{MIN}_R\left(\frac{C_{tot}(R) - Q_{tot}(R)}{C_{host}(R)}\right) - \frac{M_{spare}}{SF}\right).$$

In an alternate embodiment, $S_{HIGH}$ can be estimated from:

$$S_{HIGH} = \text{MIN}_R\left(\left(M_{remove} + \frac{M_{Spare}}{SF}\right)\frac{C_{host}(R)}{C_{tot}(R)}\right),$$

and compared to $S_P$ at step 488. If $S_P$ is greater than $S_{HIGH}$ then step 492 is performed.

Figure 10A:
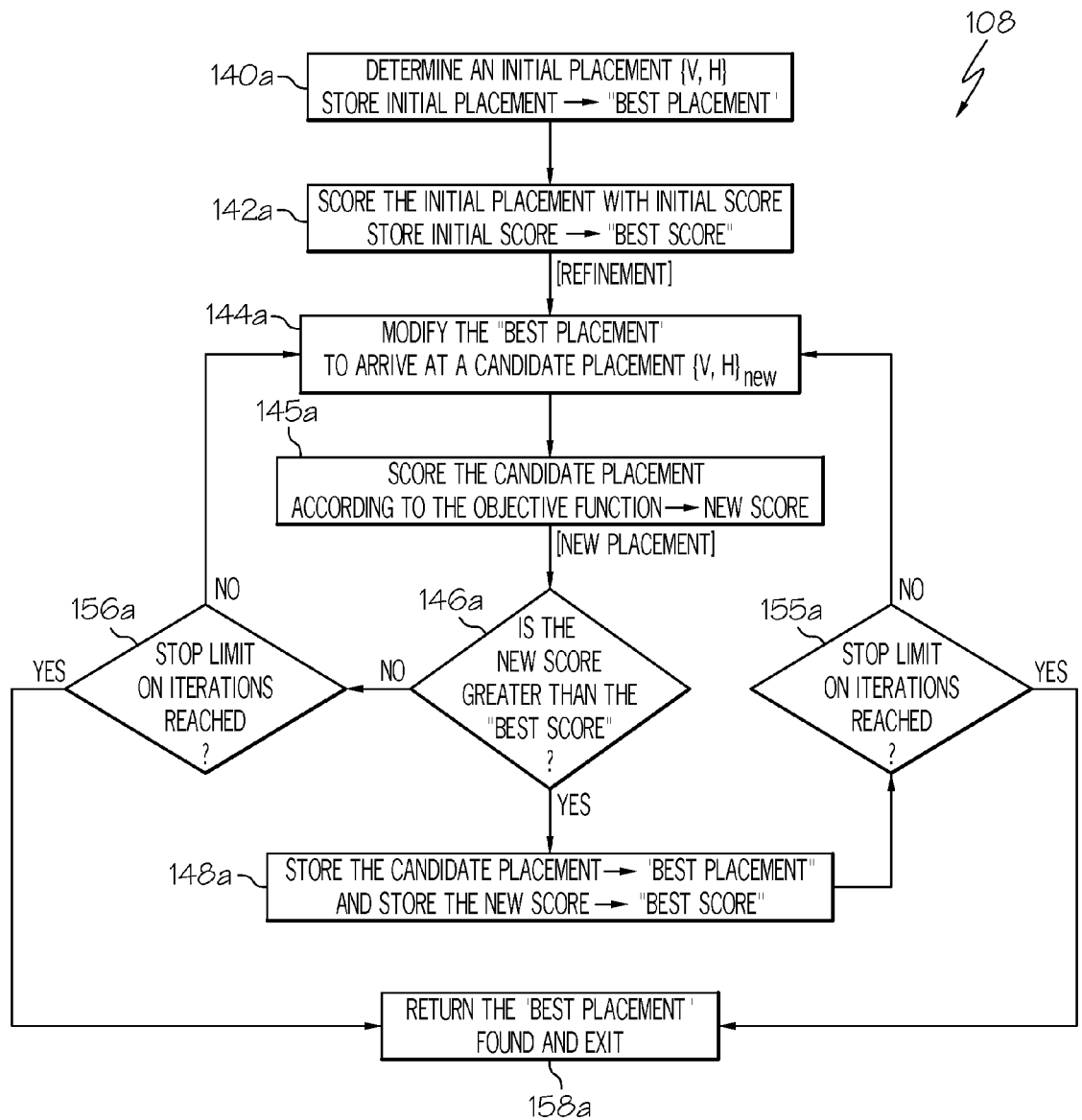
FIG. 10A is a flow chart of a placement process in a first mode of operation.

Referring to FIG. 10A, the first mode of operation of placement process 108 is described. The refinement method works to find an overall "best placement" within a pre-defined number of refinement iterations (stop limit). An iteration count is incremented whenever step 144a is performed.

Beginning at step 140a, an initial placement {(V,H)} is determined based on an input target configuration. The resulting initial placement is stored as the "best placement".

There are generally five classes of virtual machines which are dealt with during placement: new VMs that were not part of the source configuration which can be moved from host to host during placement (movable), new VMs generated from physical servers which are movable, existing movable VMs, existing soft VMs which are preferably not movable and existing hard VMs which unmovable and fixed to their source host by constraint. All five classes of VMs are placed at initial placement.

At step 142a, an "initial score" is determined for the initial placement and stored as the "best score". The iteration count is also set to zero in step 142a. All other steps of placement process 108 describe the refinement method of the placement process which takes the initial placement and modifies it one iteration at a time. The refinement method of the placement process implements a steepest descent method, which is a well-behaved method for finding the minimum of a function. The function in the placement process is the objective function implemented by a scoring process.

In alternate embodiments, other methods can be implemented to find the minimum of the objective function, for example, a stochastic search method implements a random placement of target VMs onto target hosts to search for a lowest placement score.

The refinement method begins at step 144a where the "best placement" is modified to arrive at a "candidate placement" after which the iteration count is incremented. The preferred modification in step 144a is a single VM move from the worst host to the best host where the worst host has the lowest score and the best host has the highest score in the set of hosts and where the moves are performed in order of new, existing movable, and soft VMs as required to improve the score. Other embodiments of step 144a are possible. For example, the single VM move could be chosen at random from the set of hosts. In another example, the VMs can be sorted by resource consumption on a particular resource into a sorted list and selected from the sorted list in order. In another embodiment, multiple VM moves are allowed.

Multiple VM moves can be desirable in some cases. In a first case, a pair of VMs are known to be complementary, that is one of the VM has a low score during the time intervals where the other VM has a high score. The two VMs may be paired and placed on a host together in a single refinement step. In a second case, where a pair of VMs is known to be competitive that is both VMs have a high score or both VMs have a low score, and exist on the same host, the two VMs may be paired and placed on different hosts in a single refinement step. In a third case, complementary and competitive VM sets are examined in the modification in step 144a while placing VMs. In a fourth case, analysis of complementary or competitive VMs is performed periodically by the consumption analysis server as a part of the capacity analysis. In many other cases, two or more VMs with no correlative relationship simply fit better in different locations due to sizing and other constraints.

At step 145a the "candidate placement" is scored according to an objective function and the "new score" is stored. A preferred method of scoring for both of steps 142a and 145a are presented in more detail below in FIGS. 11 and 12.

At step 146a, the refinement method compares the "new score" to the "best score". If the "new score" is greater than the "best score" the refinement method continues at step 148a.

If the "new score" is less than or equal to the "best score", step 156a is performed to check if the number of refinement iterations has reached the stop limit. When the stop limit has been reached the placement process ends at step 158a, where, the "best placement" found is returned by the placement process, which becomes the new placement even if the "best placement" is the initial placement.

If the stop limit has not been reached at step 156a, then the placement process continues at step 144a by modifying the current "best placement".

At step 148a, when the "new score" is greater than the "best score", the "candidate placement" is stored as the "best placement" and the "new score" is stored as the "best score" for subsequent iterations of the refinement method.

At step 155a, a comparison is made between the number of refinement iterations and the stop limit. If the stop limit has been reached, then step 158a is performed wherein the "best placement" found is returned by the placement process. If not, the method returns to step 144a.

Steps 156a and step 155a can be implemented using a different mechanism to stop the iterations of step 144a. In an alternate embodiment, a number of iterations performed without improvement in the best score is compared to a stop limit. In another alternate embodiment, an elapsed execution time is compared to a maximum execution time.

Figure 10B:
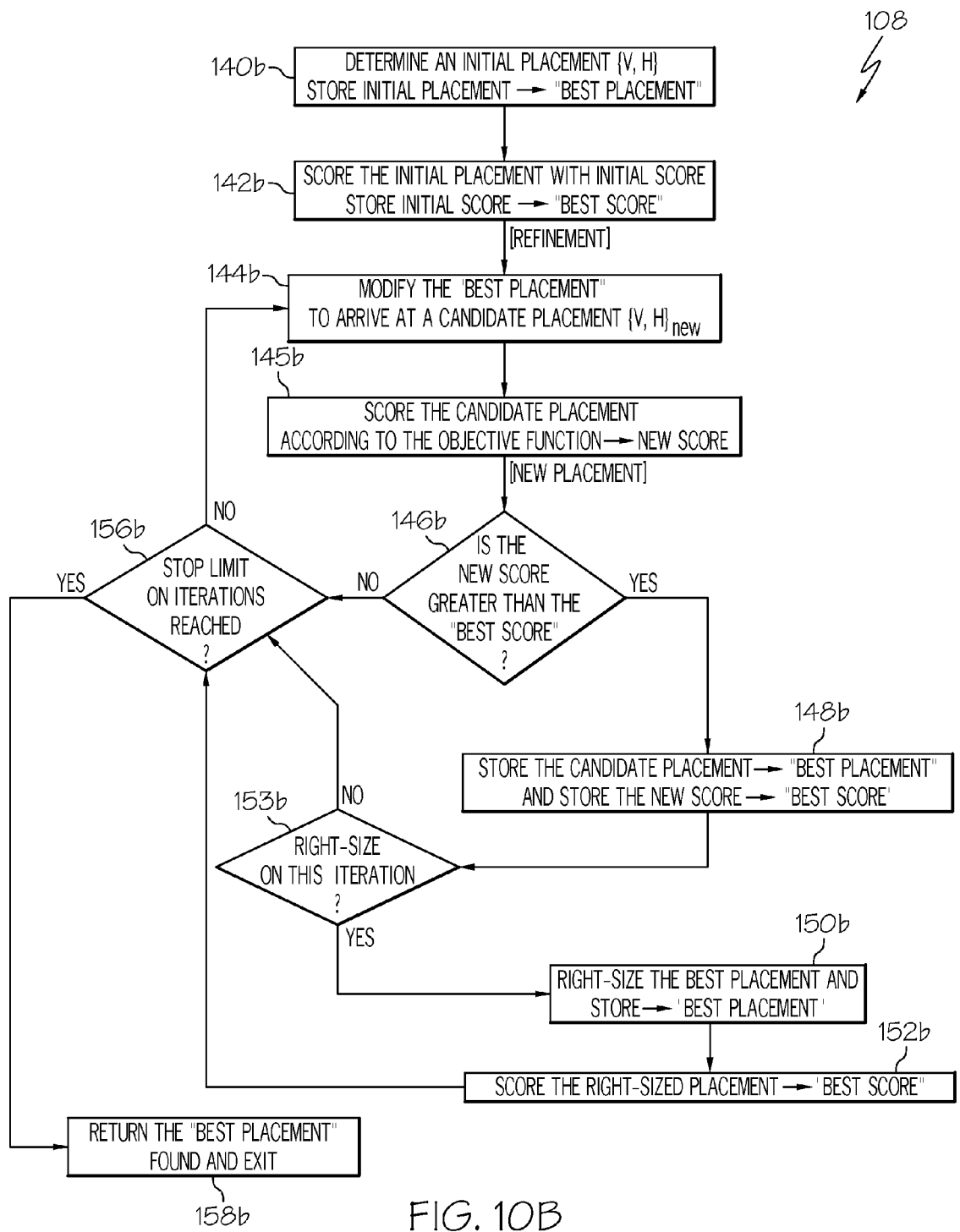
FIG. 10B is a flow chart of a placement process in a second mode of operation.

Referring to FIG. 10B, second mode of operation of placement process 108 is described. In the second mode of operation, the refinement method works to find an overall "best placement" that is "right-sized" within the pre-defined number of refinement iterations (stop limit).

Beginning at step 140b, an initial placement {(V,H)} is determined based on an input target configuration. The resulting initial placement is stored as the "best placement". At step 142b, an "initial score" is determined for the initial placement and stored as the "best score". The iteration count is also set to zero in step 142b. All other steps of placement process 108 describe the refinement method of the placement process which takes the initial placement and modifies it one iteration at a time. The refinement method of the placement process implements a steepest descent method, which is a well-behaved method for finding the minimum of a function. The function in the placement process is the objective function implemented by a scoring process.

The refinement method begins at step 144b where the "best placement" is modified to arrive at a "candidate placement" after which the iteration count is incremented. The preferred modification in step 144b is a single VM move from the worst host to the best host where the worst host has the lowest score and the best host has the highest score in the set of hosts where the worst host has the lowest score and the best host has the highest score in the set of hosts and where the moves are performed in order of new, existing movable and soft VMs as required to improve the score. Other embodiments of step 144b are possible. For example, the single VM move could be chosen at random from the set of hosts. In another example, the VMs can be sorted by resource consumption on a particular resource into a sorted list and selected from the sorted list in order. In another embodiment, multiple VM moves are allowed.

At step 145b the "candidate placement" is scored according to an objective function and the "new score" is stored. A preferred method of scoring for both of steps 142b and 145b are presented in more detail below in FIGS. 11 and 12.

At step 146b, the refinement method compares the "new score" to the "best score". If the "new score" is greater than the "best score" the refinement method continues at step 148b.

If, at step 146b, the new score is not greater than the "best score" then step 156b is performed to check if the number of refinement iterations has reached the stop limit. When the stop limit has been reached the placement process ends at step 158b. Step 158b, where the "best placement" found is returned by the placement process, even if the "best placement" is the initial placement. The "best placement" becomes the new placement.

If the stop limit has not been reached at step 156b, then the placement process continues at step 144b by further modifying the current "best placement".

Continuing with step 148b, when the "new score" is greater than the "best score", the "candidate placement" is stored as the "best placement" and the "new score" is stored as the "best score" for subsequent iterations of the refinement method. Then a right-sizing condition is checked at step 153b. If, at step 153b, the right-sizing condition is met, then a right-sizing process is performed at steps 150b and 152b, otherwise step 156b is performed to check the number of iterations against the stop limit.

At step 150b, a right-sizing process is performed on the "best placement" for the set of VMs moved in step 144b during the last iteration. The result of step 150b is a "right-sized" placement according to a right-sizing condition. The right-sizing condition includes a set of conditions that determine if a VM is allowed to be right-sized. In another embodiment, all source physical servers which are converted to a VM are right-sized. In another embodiment, a user specified right-sizing condition is selectable by a user. In yet another embodiment of a right-sizing condition, a number of iterations of the refinement method to skip before performing step 150b is prescribed. In another embodiment, the right-sizing condition is met when the number of iterations has reached the stop limit. In another embodiment, the resource consumption of a VM as it is placed determines if a right-sizing condition is met.

At step 152b, the "right-sized placement" is scored yielding a "right-sized" score. An embodiment of an intermediate right-sizing process for step 150b is described in more detail below in relation to FIG. 13. An embodiment of a scoring process in step 152b utilizes the same algorithm as in steps 142b and 145b.

After step 152b, the stop limit is checked at step 156b and the refinement method continues or stops based on the outcome of step 156b and the status of the refinement method.

Step 156b can be implemented using a different mechanism to stop the iterations of step 144a. In an alternate embodiment, a number of iterations performed without improvement in the best score is compared to a stop limit. In another alternate embodiment, an elapsed execution time is compared to a maximum execution time.

Figure 10C:
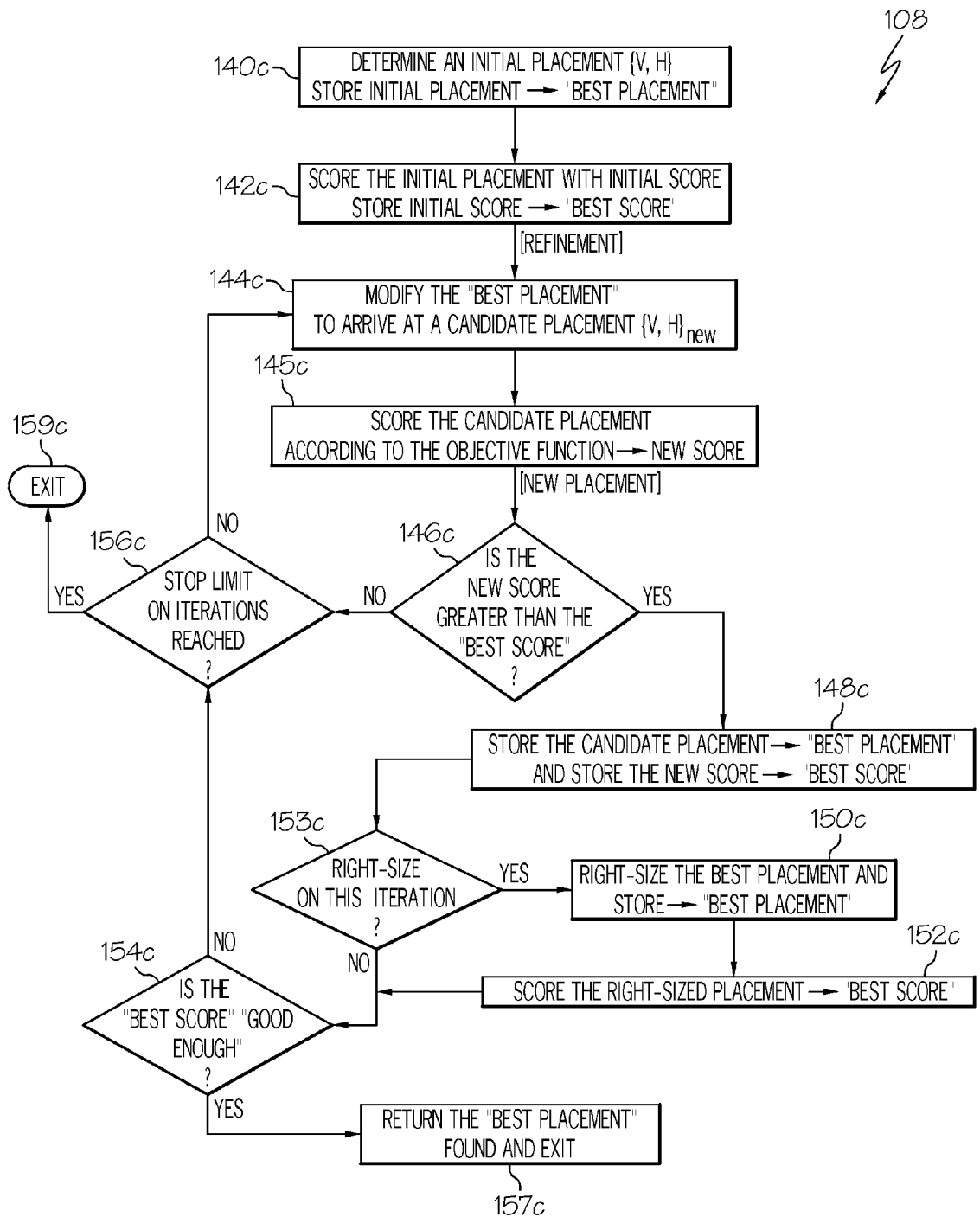
FIG. 10C is a flow chart of a placement process in a third mode of operation.

Referring to FIG. 10C, a third mode of operation for the placement process 108 is described, where the refinement method works to find the first placement that when "right-sized" is "good enough" to surpass a threshold score. Beginning at step 140c, an initial placement {(V,H)} is determined based on an input target configuration. The resulting initial placement is stored as the "best placement". At step 142c, an "initial score" is determined for the initial placement and stored as the "best score". The iteration count is also set to zero in step 142c. All other steps of placement process 108 describe the refinement method of the placement process which takes the initial placement and modifies it one iteration at a time. The refinement method of the placement process implements a steepest descent method, which is a well-behaved method for finding the minimum of a function. The function in the placement process is the objective function implemented by a scoring process.

The refinement method begins at step 144c where the "best placement" is modified to arrive at a "candidate placement" after which the iteration count is incremented. The preferred modification in step 144c is a single VM move from the worst host to the best host where the worst host has the lowest score and the best host has the highest score in the set of hosts and where the moves are performed in order of new, existing movable and soft VMs as required to find a score that is "good enough" to meet the threshold. Other embodiments of step 144c are possible. For example, the single VM move could be chosen at random from the set of hosts. In another example, the VMs can be sorted by resource consumption on a particular resource into a sorted list and selected from the sorted list in order. In another embodiment, multiple VM moves are allowed.

At step 145c the "candidate placement" is scored according to an objective function and the "new score" is stored. A preferred method of scoring for both of steps 142c and 145c are presented in more detail below in FIGS. 11 and 12.

At step 146c, the refinement method compares the "new score" to the "best score". If the "new score" is greater than the "best score" the refinement method continues at step 148c.

If, at step 146c, the new score is not greater than the "best score" then step 156c is performed to check if the number of refinement iterations has reached the stop limit. When the stop limit has been reached the placement process ends at step 159c. If the stop limit has not been reached at step 156c, then the placement process continues at step 144c by further modifying the "best placement".

If, at step 146c, the new score is greater than the "best score", then at step 148c, the candidate placement is stored as the "best placement" and the new score is stored as the "best score". The right-sizing condition is checked at step 153c. If, at step 153c, the right-sizing condition is met, then a right-sizing process is performed at steps 150c and 152c, otherwise step 156c is performed to check the number of iterations against the stop limit.

At step 150c, a right-sizing process is performed on the "best placement" for the set of VMs moved in step 144c during the last iteration. The result of step 150c is a "right-sized" placement according to a right-sizing condition. The right-sized placement is then stored as the "best placement". The right-sizing condition includes a set of conditions that determine if a VM is allowed to be right-sized. In another embodiment, all source physical servers which are converted to a VM are right-sized. In yet another embodiment, a user specified right-sizing condition is selectable by a user. In another embodiment of a right-sizing condition, a number of iterations of the refinement method to skip before performing step 150c is prescribed. In still another embodiment, the right-sizing condition is met when the number of iterations has reached the stop limit. In another embodiment, the resource consumption of a VM as it is placed determines if a right-sizing condition is met.

At step 152c, a score is determined for the right-sized placement and stored as the "best score". At step 154c, the "best score" is compared to the threshold score. If the "best score" is greater than or equal to the threshold score the "best placement" is considered to be a "good enough" placement suitable for implementation. In this case the placement process ends at step 157c by returning the "best placement" which becomes the new placement.

At step 154c, if the "right-sized" score is less than the threshold score, then the stop limit on refinement iterations is checked at step 156c and the refinement method continues or stops based on the outcome of step 156c and the status of the refinement method. Step 156b can be implemented using a different mechanism to stop the iterations of step 144b. In an alternate embodiment, a number of iterations performed without improvement in the best score is compared to a stop limit. In another alternate embodiment, an elapsed execution time is compared to a maximum execution time.

Figure 10D:
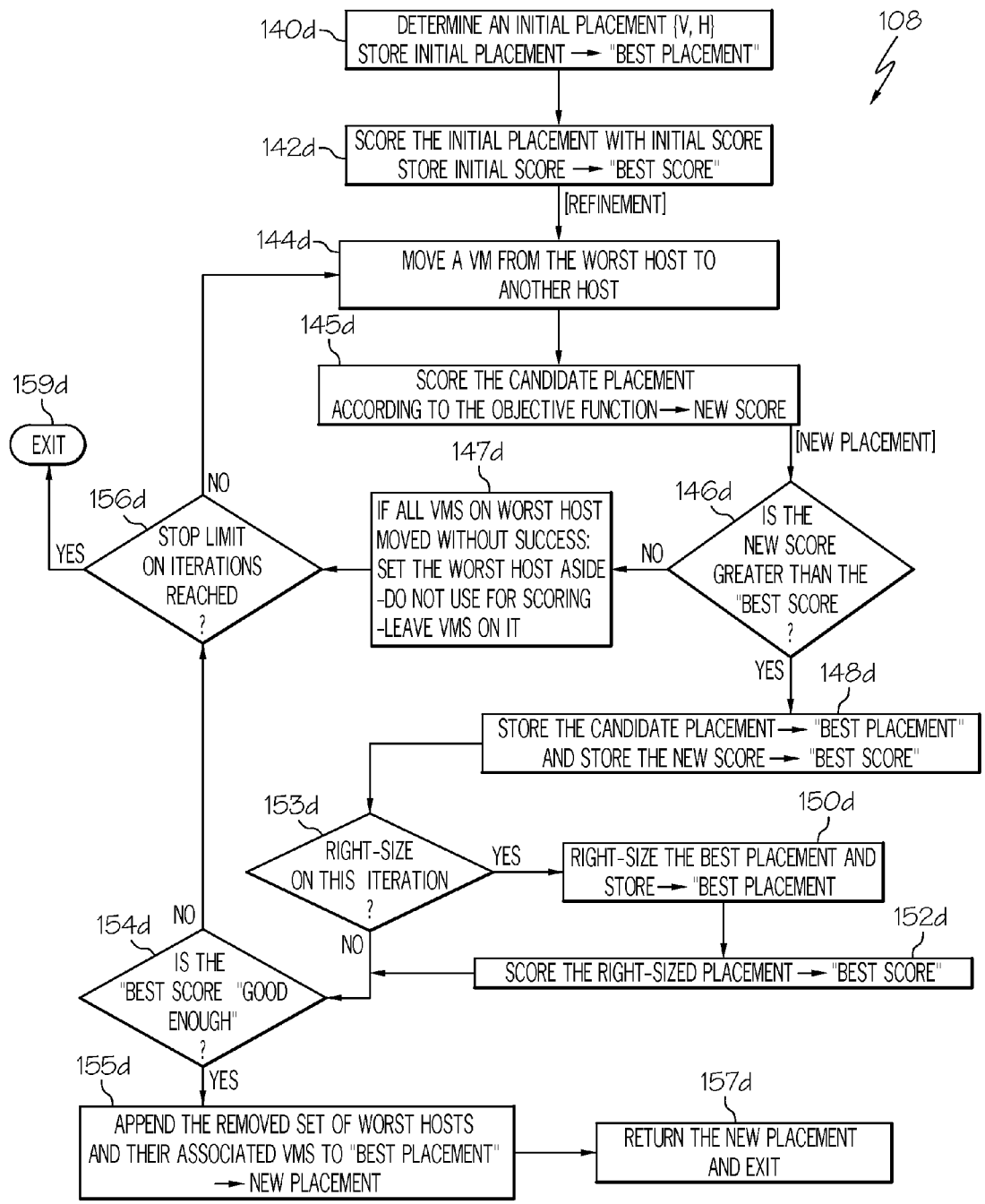
FIG. 10D is a flow chart of a placement process in a fourth mode of operation.

An embodiment of placement process 108 implements a fourth mode of operation as described in FIG. 10D. In the fourth mode of operation, the refinement method works to find the first placement that when "right-sized" is "good enough" to surpass a threshold score. Beginning at step 140d, an initial placement {(V,H)} is determined based on an input target configuration. The resulting initial placement is stored as the "best placement". At step 142d, an "initial score" is determined for the initial placement and stored as the "best score". The iteration count is also set to zero in step 142d. All other steps of placement process 108 describe the refinement method of the placement process which takes the initial placement and modifies it one iteration at a time.

The refinement method begins at step 144d where the "best placement" is modified to arrive at a "candidate placement" after which the iteration count is incremented. At step 144d, a single VM is moved from the worst host to another host. In an embodiment the single VM is moved from the worst host to the best host where the worst host has the lowest score and the best host has the highest score in the set of hosts and where the moves are performed in order of new, existing movable and soft VMs as required to find a score that is "good enough" to meet the threshold.

At step 145d the "candidate placement" is scored according to an objective function and the "new score" is stored. A preferred method of scoring for both of steps 142d and 145d are presented in more detail below in FIGS. 11 and 12.

At step 146d, the refinement method compares the "new score" to the "best score". If the "new score" is greater than the "best score" the refinement method continues at step 148d.

If, at step 146d, the new score is not greater than the "best score" then step 147d is performed. At step 147d, if all of the movable VMs assigned to worst host have been moved without yielding a placement score better then the best score, then the worst host and the unmovable subset of VMs still assigned to the worst host are removed from further consideration in the method and stored in a set of removed VM-host pairs. The worst host is not scored and no VMs in the unmovable subset of VMs are moved thereafter.

The method then continues at step 156d, where the number of refinement iterations is compared to the stop limit. When the stop limit has been reached the placement process ends at step 159d. If the stop limit has not been reached at step 156d, then the placement process continues at step 144d by further modifying the "best placement".

If, at step 146d, the new score is greater than the "best score", then at step 148d, the candidate placement is stored as the "best placement" and the new score is stored as the "best score". The right-sizing condition is checked at step 153d. If, at step 153d, the right-sizing condition is met, then a right-sizing process is performed at steps 150d and 152d, otherwise step 156d is performed to check the number of iterations against the stop limit.

At step 150d, a right-sizing process is performed on the "best placement" for the set of VMs moved in step 144d during the last iteration. The result of step 150d is a "right-sized" placement according to a right-sizing condition. The right-sized placement is then stored as the "best placement". The right-sizing condition includes a set of conditions that determine if a VM is allowed to be right-sized. In another embodiment, all source physical servers which are converted to a VM are right-sized. In yet another embodiment, a user specified right-sizing condition is selectable by a user. In another embodiment of a right-sizing condition, a number of iterations of the refinement method to skip before performing step 150d is prescribed. In still another embodiment, the right-sizing condition is met when the number of iterations has reached the stop limit. In another embodiment, the resource consumption of a VM as it is placed determines if a right-sizing condition is met.

At step 152d, a score is determined for the right-sized placement and stored as the "best score". At step 154d, the "best score" is compared to the threshold score. If the "best score" is greater than or equal to the threshold score the "best" placement is considered to be a "good enough" placement suitable for implementation. At step 155d, the set of removed VM-host pairs is appended to the "best placement" to arrive at the new placement and if the set of removed VM-host pairs is not empty (that is, if any VM-host pairs were removed in step 147d), then score the placement as the score of the first host removed in the process. The placement process ends at step 157d by returning the new placement.

At step 154d, if the "right-sized" score is less than the threshold score, then the stop limit on refinement iterations is checked at step 156d and the refinement method continues or stops based on the outcome of step 156d and the status of the refinement method.

Step 156d can be implemented using a different mechanism to stop the iterations of step 144d. In an alternate embodiment, a number of iterations performed without improvement in the best score is compared to a stop limit. In another alternate embodiment, an elapsed execution time is compared to a maximum execution time.

Another alternative embodiment of the refinement method uses a different method for generating candidate placements during refinement (at steps 144a, 144b, 144c and 144d). A "critical resource" is defined as the resource having the greatest ratio of total VM resource consumption, summed over all VMs, to total available capacity summed over all hosts. For the modification step, a move is attempted with a VM having the least consumption of the critical resource on the worst host, moving the VM from the worst host to the host with the greatest available capacity of the critical resource. Additionally in the fourth mode of operation, at step 147d, if the critical resource has failed to improve the score, the worst host can be discarded without trying to move all of the other VMs on the worst host.

Referring to FIGS. 11A, 11B, 12A and 12B, an embodiment of the scoring process used during placement and during right-sizing is described.

Figure 11A:
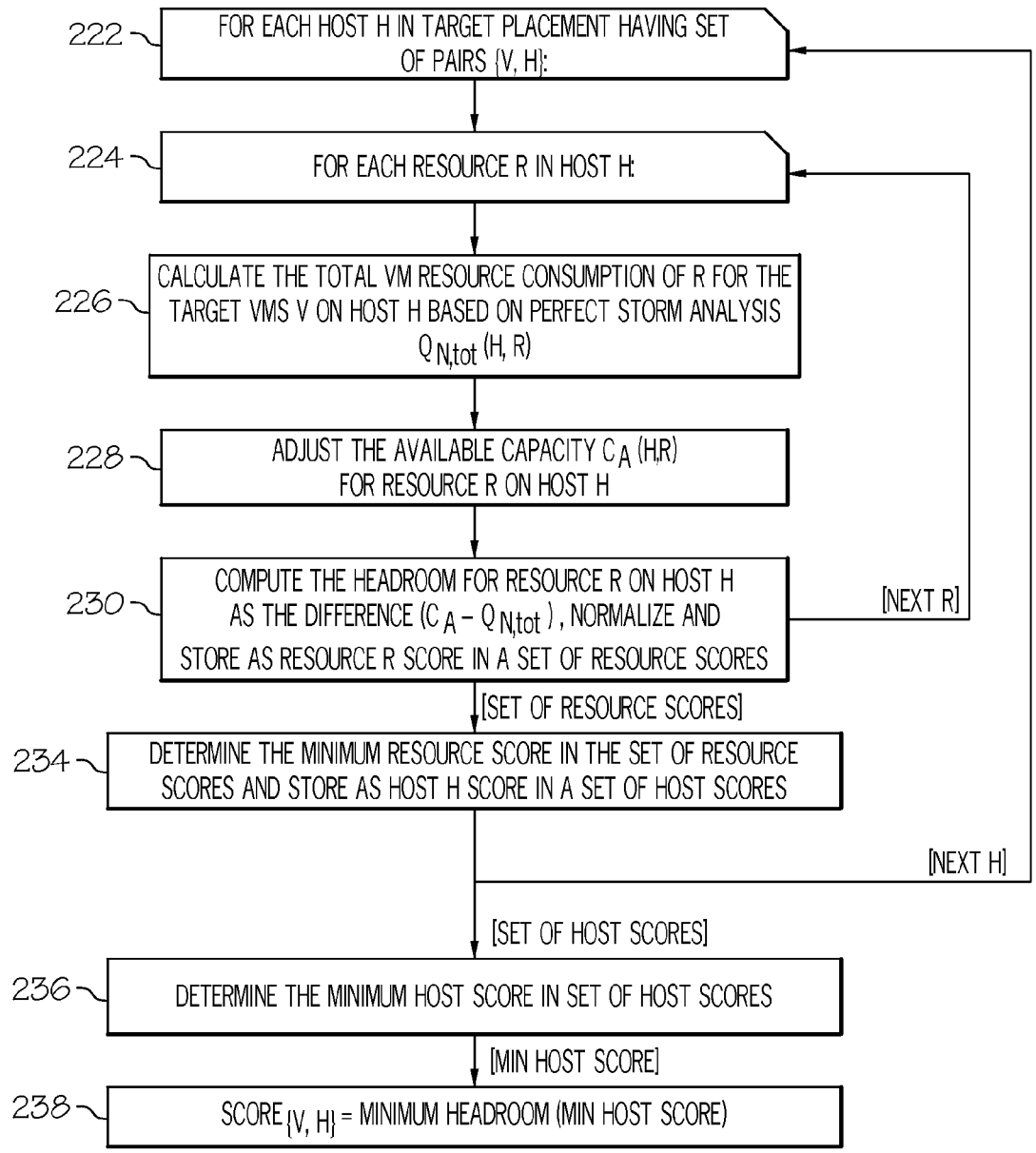
FIG. 11A is a flow chart of a scoring process for scoring a placement.
Figure 11B:
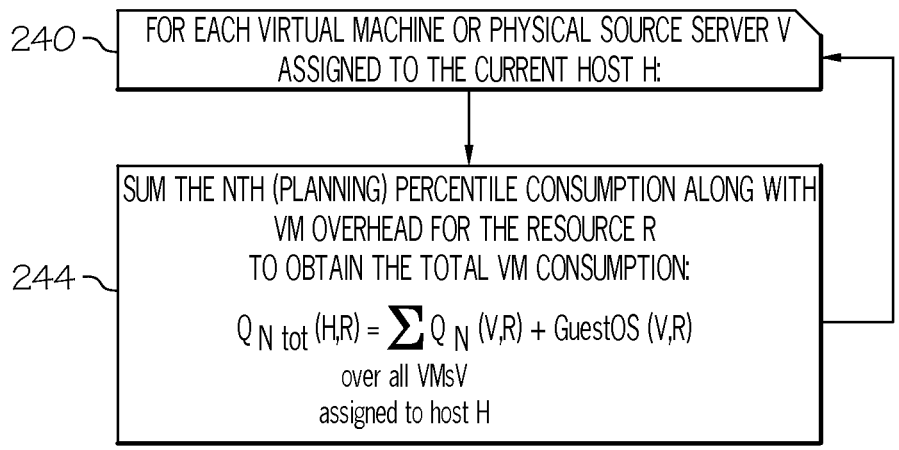
FIG. 11B is a flow chart of a resource consumption analysis.

Referring to FIG. 11A, the scoring process requires as input a target placement {(V,H)}. Steps 222 and 224 specify that the following steps are repeated for each host H and each resource R in each host H, respectively. At step 226, the total VM resource consumption is computed for resource R on host H based on Nth percentile VM resource consumptions.

Figure 12B:
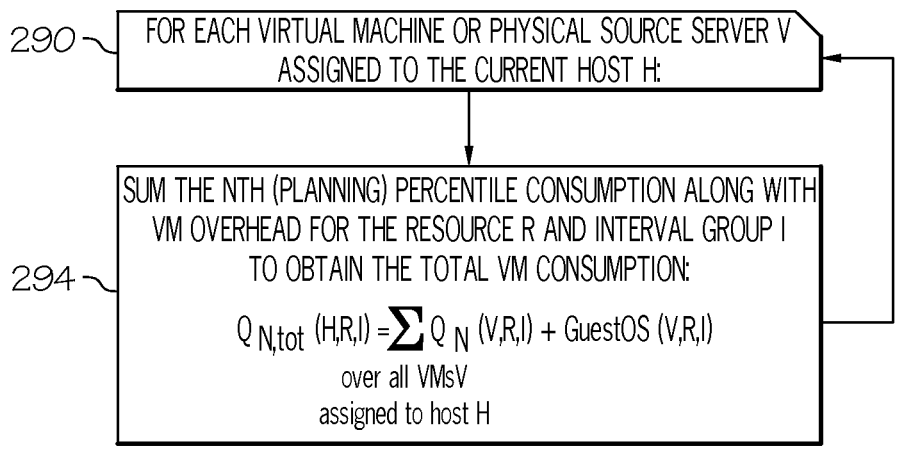
FIG. 12B is a flow chart of a resource consumption analysis.
Figure 12A:
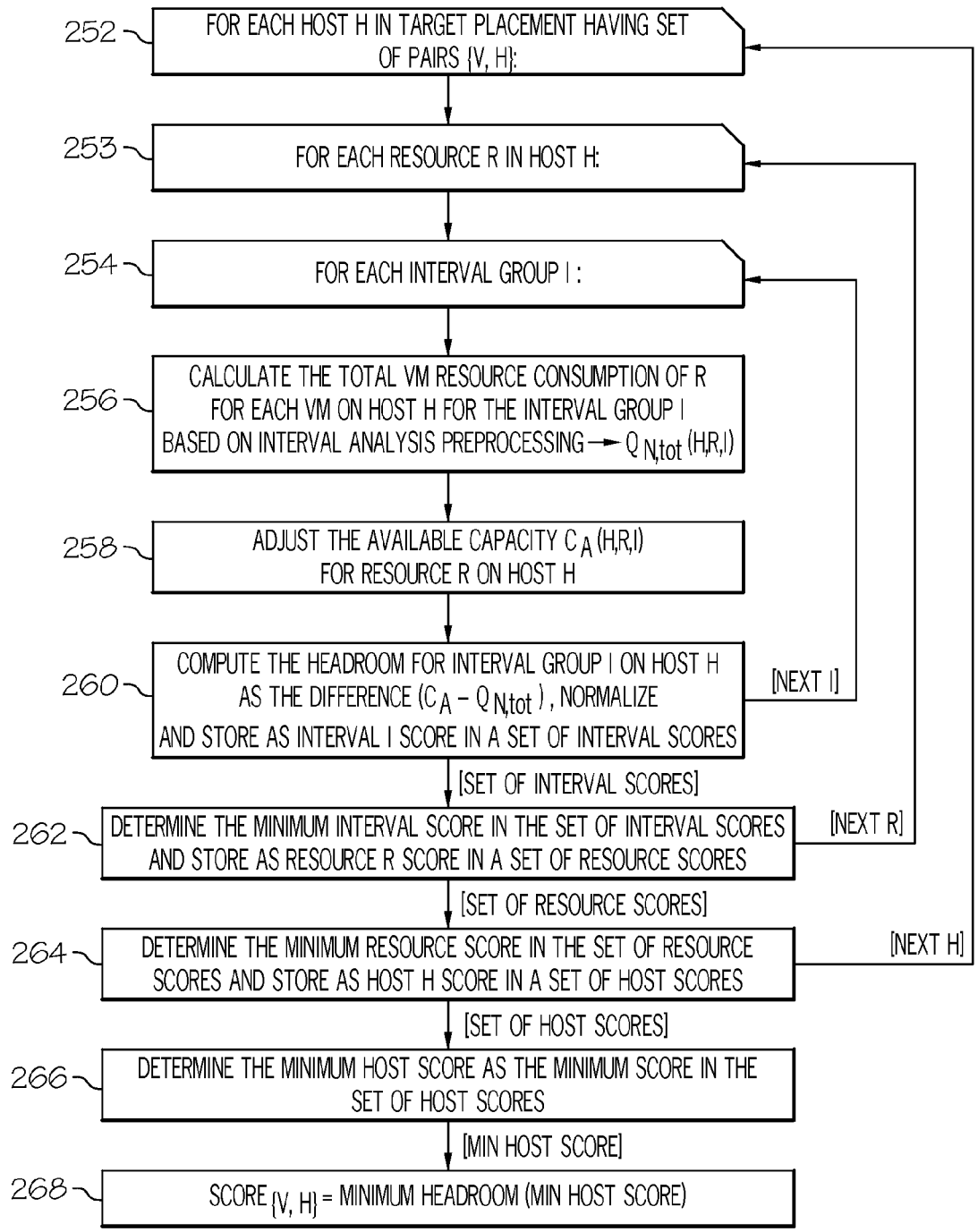
FIG. 12A is a flow chart of a scoring process for scoring a placement.

Referring to FIG. 12A, step 226 is described. At step 240, step 244 is performed for each virtual machine and physical server V assigned to host H and for resource R assigned to V. Step 244 computes the planning percentile consumption according to:

$$Q_{N,tot}(H, R) = \sum_{\substack{all\ VMs\ V \\ placed\ on\ host\ H}} Q_N(V, R) + GuestOS(V, R)$$

where the $Q_N(V,R)$ is the Nth percentile resource consumption across all regularized time blocks and for a past time period for VM (or physical server) V and the GuestOS(V,R) is the estimated guest overhead for VM V.

Returning to FIG. 11A, at step 228, the method adjusts the available capacity $C_A(H,R)$ for resource R on host H by recomputing the processor efficiency through a processor scalability analysis and recomputing the VMM efficiency through a VMM scalability analysis on the VMs placed on host H. It is assumed that the processor efficiency and the VMM efficiency are constant and no adjustment is performed unless the placement process is being run for a final right-sized placement.

At step 230, the headroom for resource R on host H is computed as the difference between the available capacity on the host and the total VM consumption, normalized and stored as a resource score in a set of resource scores. The resource score is computed as $$Score(H,R)=(C_A(H,R)-Q_{N,tot}(H,R))/C_A(H,R)$$

At step 224, the scoring process repeats for all other resources in the host H.

At step 234, the host score for host H is determined as the minimum score in the set of resource scores: Score $(H)=MIN_R(Score(H,R))$. The host score is stored in a set of host scores. At step 222, the scoring process repeats for all other hosts in the target placement.

At step 236, the aggregate score is determined as the minimum score in the set of host scores. If there are multiple clusters then the aggregate score represents a cluster score in a set of cluster scores and an overall score is determined as the minimum score in the set of cluster scores.

At step 238, the placement score, Score{(V,H)}, is set equal to the aggregate score if the target configuration has a single cluster or single set of hosts. Score{(V,H)} is equal to the overall score if the target configuration has multiple clusters.

The result of steps 165, 166 and 167 is a "right-sized" placement. At step 168 a placement score is computed for the "right-sized" placement according to the scoring process of FIG. 11B.

Referring to FIG. 12A, the scoring process requires as input, a target placement {(V,H)}. Steps 252, 253 and 254 specify that the following steps are repeated for each host H, each resource R in each host H, and for each interval I in a block of intervals, respectively where the block of intervals comprise a set of regularized time blocks or grouped intervals. At step 256, the total VM resource consumption is computed for resource R on host H during interval I. In an embodiment, interval I represents an interval group comprising a set of interval data collected from a tagged group of sample periods during a regularized time block.

An Nth percentile VM resource consumption for a given regularized time block is the Nth percentile computed from VM resource consumption reported for all sample periods available for the resource during the given regularized time block. An Nth percentile VM resource consumption for a given interval group is the Nth percentile computed from VM resource consumption reported for the tagged group of sample periods associated to the given interval group.

Referring to FIG. 12B, step 256 (FIG. 12A) is described. At step 290, step 294 is performed for each virtual machine and physical server V assigned to host H and for resource R assigned to V in interval I. Step 294 computes the total VM resource consumption as a sum of VM planning percentile consumptions according to:

$$Q_{N,tot}(H, R, I) = \sum_{\substack{all\ VMs\ V \\ placed\ on\ host\ H}} Q_N(V, R, I) + GuestOS(V, R, I)$$

where the $Q_N(V,R,I)$ is the Nth percentile resource consumption for VM (or physical server) V computed for the interval I across all included sample periods for a past time period and the GuestOS(V,R,I) is the estimated guest overhead for VM V, resource R and interval I.

Returning to FIG. 12A, at step 258, the method adjusts the available capacity $C_A(H,R,I)$ for resource R on host H by recomputing the processor efficiency through a processor scalability analysis and recomputing the VMM efficiency through a VMM scalability analysis on the VMs placed on host H. It is assumed that the processor efficiency and the VMM efficiency are constant across intervals and no interval level adjustment is performed unless the placement process is being run for a final right-sized placement.

At step 260 the headroom for resource R on host H is computed as the difference between the available capacity on the host and the total VM consumption, normalized and stored as an interval score in a set of interval scores. The interval score is computed as $$\text{Score}(H,R,I) = (C_A(H,R,I) - Q_{N,tot}(H,R,I))/C_A(H,R,I)$$

At step 254, the scoring process repeats for all other intervals and the resource R for the host H.

At step 262, the resource score for resource R in host H is determined as the minimum score in the set of interval scores: $\text{Score}(H,R) = \text{MIN}_I(\text{Score}(H,R,I))$. The resource score is stored in a set of resource scores. The method repeats after step 262 at step 253 for all other resources in host H. The resource score is stored in a set of resource scores.

At step 264, the host score for host H is determined as the minimum score in the set of resource scores: $\text{Score}(H) = \text{MIN}_R(\text{Score}(H,R))$. The host score is stored in a set of host scores. At step 252, the scoring process repeats for all other hosts in the target placement.

At step 266, the aggregate score is determined as the minimum score in the set of host scores. If there are multiple clusters then the aggregate score represents a cluster score in a set of cluster scores and an overall score is determined as the minimum score in the set of cluster scores.

At step 268, the placement score, $\text{Score}\{(V,H)\}$, is set equal to the aggregate score if the target configuration has a single cluster or single set of hosts. $\text{Score}\{(V,H)\}$ is equal to the overall score if the target configuration has multiple clusters.

Other embodiments of the scoring process are possible. For example, in alternate embodiment of the scoring process, an alternative placement score is computed for a resource by calculating the joint probability that the resource's consumptions for all VMs placed on a host will obtain a threshold score. The alternative placement score can computed in a first alternate embodiment on a set of regularized time blocks or in a second alternate embodiment a single regularized time block across a group of sample periods.

In set of alternate embodiments, other metrics are used to define an objective function for the scoring process. All of the various host level resources: CPU, memory, network interfaces, disk storage are available as metrics for which the capacity headroom metric and threshold score have been described. In a first alternate embodiment of the scoring process, scoring is restricted to the metric computed for host level resources to only those VMs that are movable. In a second alternate embodiment for the scoring process the fraction of existing VMs moved is used as a metric with a threshold score at or near 1.0. In a third alternate embodiment of the scoring process, the number of VMs per host is a metric and the threshold score is a function of the host class specifications associated to the host. In a fourth alternate embodiment of the scoring process, the number of VCPUs per host is a metric and the threshold score is a function of VMM capacity and host class specifications. In a fifth alternate embodiment of the scoring process, infrastructure cost is a metric with a pre-determined fractional improvement as the threshold. In a sixth alternate embodiment of the scoring process, placements are scored across multiple widely varying metrics by defining an appropriate normalization for each metric value, scoring across all metric values to find a set of resulting placement scores, and using the resulting placement scores to find the placement with the maximum of a minimum headroom value across all the metrics.

Figure 13:
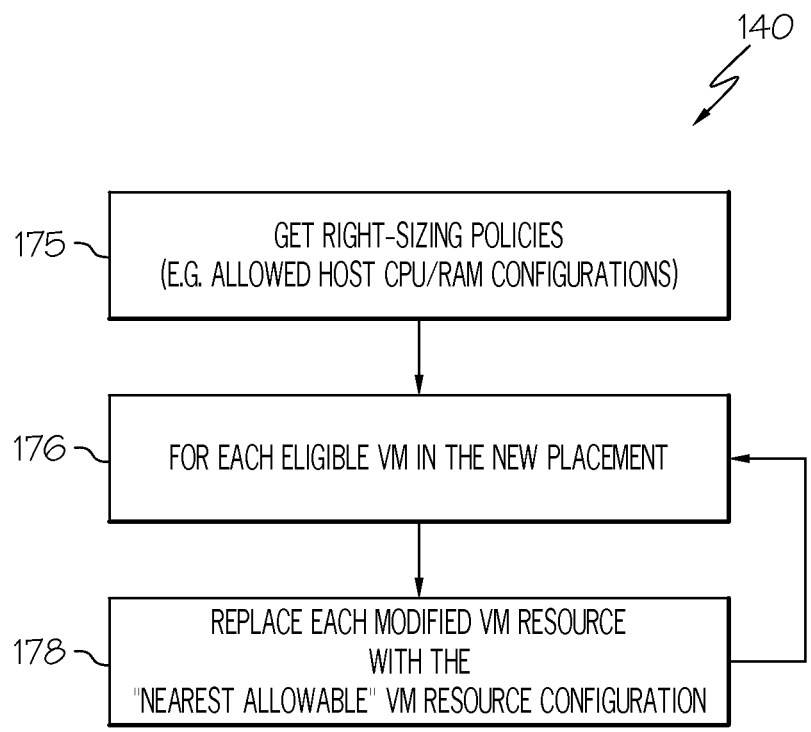
FIG. 13 is a flow chart for an intermediate right-sizing method.

Referring to FIG. 13, an embodiment of an intermediate right sizing process suitable for steps 150a, 150b, 150c and 150d is shown. At step 175, a set of right-sizing policies are received. The set of right sizing policies preferably include an allowed set of host configurations and allowed set of VM configurations and are specified in a set of host templates and a set of VM templates. Each virtual machine (VM) has a resource configuration describing the required VCPUs, virtual RAM, and so forth. Virtual machine monitors and virtual machine tools from various vendors, as well as industry standards dictate a defined set of resource configurations.

At step 176, the step 178 is repeated for all eligible virtual machines where "eligible" is a user selectable parameter. The "eligible" parameter is specified by the user and can include several potential conditions. In a first case, the parameter is set to "none." In this case, "right-sizing" is never performed. In a second case, the parameter is set so that only VMs that were moved during the placement process are eligible for right-sizing. In a third case, all VMs are eligible for right-sizing.

At step 178, a VM configuration returned from the placement process is reconfigured with a "nearest allowable" VM configuration that is also a right-sized VM configuration. The "nearest allowable" VM configuration can be selected from a fixed set of VM size constraints, by applying a set of VM sizing rules to the existing VM configuration or by a combination of selecting from the fixed set of VM size constraints and applying the set of VM sizing rules.

In a first example of determining "nearest allowable" VM configuration, a size constraint is applied to a first VM where the size constraint is selected from the fixed set of VM size constraints based on the VM size needed for the interval group of the first VM's greatest consumption in the interval analysis.

In a second example of determining "next largest allowable" VM configuration, a size constraint is applied to a second VM where the size constraint is selected from the fixed set of VM size constraints based on the second VM's Nth percentile VM resource consumption. In the second example, the second Nth percentile VM resource consumption used for right-sizing can be the same or different than the Nth percentile VM resource consumption used in the scoring process where N ranges from 50 to 100.

In an embodiment of step 178, the second example is implemented where the Nth percentile VM resource consumption used for right-sizing is larger than the Nth percentile VM resource consumption used in scoring (e.g. scoring uses $75^{th}$ percentiles, right-sizing uses $85^{th}$ percentiles) and the second Nth percentile VM resource consumption is computed across all regularized time blocks over a long time period.

In a third example, a size constraint is applied to a third VM where the size constraint is calculated by multiplying the third VM existing resource consumption by a pre-defined inflation factor to arrive at a computed VM resource consumption and then taking the mathematical ceiling of the computed VM resource consumption to specify a minimum resource consumption for the third VM. In a more detailed example of the third example, suppose an existing VM consumption of processing power is 2.9 VCPU and the pre-defined inflation factor is selected as 1.25. Multiplying the processing power by the pre-defined inflation factor and taking the ceiling results in a specification of 4.0 VCPU for a "nearest allowable" VM configuration.

In a fourth example, a size constraint is applied to a fourth VM where the size constraint is calculated by multiplying a fixed VM constraint from the fixed set of VM constraints by a pre-defined inflation factor to arrive at a computed VM resource consumption and then taking the mathematical ceiling value of the computed VM resource consumption to specify the resource configuration.

The result of steps 175, 176 and 178 is a "right-sized" placement.

The pre-processing method, placement process and scoring process are amenable to parallel processing. For example, in an alternate embodiment of the pre-processing method, each loop of step 120 and step 121 of FIG. 7A can be performed in parallel by a set of processors. In another alternate embodiment of the scoring process, each loop of step 222 and step 224 of FIG. 11 can be performed in parallel by a set of processors during placement.

In another example of parallel processing applied to the placement process, the refinement method in the placement process can be split into multiple refinements executing on parallel processors, where each refinement modifies the "best placement" by randomly selecting a VM for relocation and where the random selection is seeded differently for each refinement. Once all of the refinements terminate, the resulting "best placements" can be compared and the near optimal "best placement" selected. In this example, the steps described for the first mode of operation (FIG. 10A) are operated in parallel, with the addition of a final comparison step to select the near optimal "best placement".

Referring to FIG. 14, a pseudocode listing is provided for an exemplary embodiment of a general placement method 1000. At line 1009, a threshold placement score is determined. At line 1010 an initial placement is constructed from a set of user-specified source machines onto a user-specified set of target hosts and the current placement is set equal to the initial placement. At line 1011, a current placement score is determined for the current placement. Lines 1012-1017 form a loop and at line 1012 a while condition is checked. At line 1012, if the current placement score is greater than the threshold placement score then the while condition is met. If the number of candidate placements considered in the loop is not larger than a pre-defined placement count, then the while condition is met. If the execution time of the loop is not larger than a pre-defined execution time, then the while condition is met. At line 1013 a candidate placement is generated and scored with a placement score. At line 1014 if the candidate placement is better than the current score, then at line 1015 the candidate placement is accepted as the current placement with current score equal to the placement score.

Referring to FIG. 15, a pseudocode listing is provided for an example embodiment of an initial placement method 1001 which is used in line 1010 of general placement method 1000. Lines 1021-1033 form a while loop. At line 1020, an initial placement is started with a set of unmovable virtual machine, host pairs. In an alternate embodiment, the initial placement is started with no virtual machine, host pairs. At line 1021, the while loop continues if not all virtual machines in the target set of virtual machines have been placed into the initial placement where the target set of virtual machines includes new VMs, new VMs from the source set of physical servers, existing movable VMs, soft VMs (movable, but preferably stationary) and hard VMs (unmovable). At line 1022, a virtual machine V is selected for placement by random selection from the subset of target virtual machines that have not yet been placed. Lines 1023-1032 form a begin-end loop. At line 1024 a target host H is selected at random from the set of target hosts and a set of scores is emptied. At line 1025 virtual machine V is assigned to target host H and appended to the initial placement to form a resulting placement for which a resulting placement score is determined and stored in the set of scores. At line 1026, if the resulting placement score is greater than the threshold score, then at line 1027 resulting placement is accepted as the initial placement and the loop continues at line 1024. At line 1028, if the resulting placement score is not greater than the threshold score and if a pre-defined number of loops have executed for the begin-end loop, then at line 1029 the resulting placement corresponding to the best score in the set of scores is accepted as the initial placement and the loop continues at line 1024. At line 1032 the begin-end loop is repeated for all hosts in the target set of hosts. At line 1033 the while loop is repeated. At line 1034, the result of the initial placement method is an initial placement of all VMs from the target set of virtual machines onto the target set of hosts including any unmovable VMs.

Referring to FIG. 16, a pseudocode listing is provided for an example embodiment of an alternate initial placement method 1002 which is used in line 1010 of general placement method 1000. At line 1040, an initial placement is started with no virtual machine, host pairs. At line 1041, the set of target virtual machines are sorted on the most critical resource into a VLIST from the largest resource consumer to the smallest resource consumer. At line 1042 the target set of hosts are sorted into an HLIST on the most critical resource from largest headroom to smallest headroom. The VLIST includes all of the new VMs, new VMs from the source set of physical servers, existing movable VMs, soft VMs (movable, but preferably stationary) and hard VMs (unmovable).

Lines 1043-1057 form a while loop. At step 1043, the while loop continues if not all virtual machines in the target set of virtual machines have been placed into the initial placement. At line 1044, the next virtual machine V is selected from the VLIST, beginning with the largest resource consumer. Lines 1045-1054 form a begin-end loop. At line 1046, the next target host H is selected from the HLIST, beginning with the target host having the largest headroom and a set of scores is emptied. At line 1047, the next virtual machine V is assigned to the next target host H and appended to the initial placement to form a resulting placement for which a resulting placement score is determined and stored in the set of scores. At line 1048, if the resulting placement score is greater than the threshold score, then at line 1049, the resulting placement is accepted as the initial placement and the loop continues at line 1044. At line 1050, if the resulting placement score is not greater than the threshold score and if a pre-defined number of loops have executed for the begin-end loop, then at line 1051 the resulting placement corresponding to the best score in the set of scores is accepted as the initial placement and the loop continues at line 1044. At line 1054, line 1046 is repeated for all hosts in the target set of hosts. At line 1055, the available capacity of the next target host H is reduced by the VM resource consumption of the next virtual machine V and the set of target hosts are re-sorted as in line 1042. At line 1056, the while loop is repeated at line 1044. At line 1057 the while loop is terminated. The result of the initial placement method is an initial placement of all VMs from the target set of virtual machines onto the target set of hosts including any unmovable VMs.

Referring to FIGS. 17A and 17B, a pseudocode listing is provided for an example embodiment of a threshold scoring method 1003. Threshold scoring method 1003 is used in line 1009 of general placement method 1000 and includes lines 1060-1081. At line 1060 a set of target hosts and a set of target VMs are provided. Lines 1061-1063 are executed for each resource r in a set of host resources. At line 1062 the total resource consumption of all VM in the set of target VMs, $Qtot(r)$, is computed as a sum over all VMS of the Nth percentile consumptions of resource r by each VM plus an estimated GuestOS overhead for each VM on resource r.

At line 1063, if the resource r is CPU, then estimate the average number of virtual CPUs, and the average number of processor threads consumed per host. At line 1064, the available capacity is computed for all hosts in the set of target hosts.

Lines 1065-1075 are executed for each host h in the target set of hosts and lines 1066-1075 are executed for each resource r in the set of host resources. At line 1067, the raw capacity is computed for resource r on host h. At line 1068, if the resource r is CPU then execute lines 1069-1071. At line 1069, the processor efficiency is computed for host h using a scalability model for host h. At line 1070, a VMM efficiency is computed for host h using a VMM scalability analysis and the average number of virtual CPUs per host. At line 1071, a CPU effective capacity for host h, CH(r=CPU) is computed by multiplying the raw capacity by the processor efficiency and the VMM efficiency.

Lines 1072-1073 are executed if the resource r is not CPU. At line 1073, a host effective capacity CH(r) for resource r is set equal to the raw capacity for resource r.

At line 1075, the host available capacity is computed as $C_A(h,r)=CH(r)\times(1-CR(r))$ where CR is a pre-determined capacity reserve for the resource r.

Referring to FIG. 17B, Lines 1076-1079 compute the ideal resource scores. Lines 1077-1079 are repeated for each resource r in the set of host resources. At line 1078 the total available capacity Ctot(r) of the set of target hosts is calculated as the sum of $C_A(h,r)$ over all hosts h. At line 1079 the ideal resource score for resource r is computed as $S(r)=(1-Qtot(r)/Ctot(r))$. At line 1080 the overall ideal score is computed as the minimum of all ideal resource scores for the set of host resources. At line 1081 the threshold score is determined as a pre-defined fraction F of the overall ideal score.

Referring to FIG. 18, a pseudocode listing is provided for an example embodiment of refinement method 1004 suitable for use in the placement process. According to line 1089, refinement method 1004 is substituted for lines 1012-1017 in general placement method 1000. Refinement method 1004 includes lines 1089-1105 and features a repetition of a single move refinement at lines 1093-1102. Refinement method has an initial placement as input which becomes a refined placement as the refinement method proceeds, a set of target hosts and a set of target VMs placed according to the initial placement on the set of target hosts. According to line 1090 the set of target hosts are sorted by increasing score order into a list HLIST. The single move refinement starts at line 1092 with a single VM selected from the worst host (host with the lowest score) in HLIST. A single move refinement begins at line 1093 and ends at line 1102 wherein the single VM is reassigned to a different host in HLIST in an attempt to improve an overall score for the refined placement.

At line 1094, a tentative assignment of the single VM is made to the best host (host with the highest score), the overall score for the tentative reassignment computed, the worst and best target hosts are scored again and an overall score is recomputed. At line 1095, if the tentative reassignment improves the overall score, line 1096 is executed, where the tentative reassignment is accepted as the refined placement, the set of target hosts are resorted into HLIST again and the refinement method starts again at line 1092.

At step 1097, if reassignment of a virtual machine V to the best host in HLIST does not improve the overall score, then lines 1098-1101 are executed. At line 1098, virtual machine V is tentatively assigned to the remaining hosts in RUSTS in increasing score order (and scored) until an improvement in the overall score occurs or all candidate hosts have been considered. At line 1099, if no reassignment of V to any host in HLIST improves the overall score, then step 1092 is repeated for different VM and the refinement method starts again with the refined placement as generated so far by the refinement method. At line 1100, if reassignment of all movable VMs on the worst hosts have been attempted without an improvement in the overall score, the worst host is removed from HLIST and the refinement method repeats at line 1092. According to line 1103, the refinement method is repeated at line 1091 until the overall score is greater than threshold, "good enough" or the number of refinement iterations is too large. The set of target hosts can describe a small set of hosts, a cluster or a set of clusters as existing in an existing cloud configuration or in a hypothetical cloud configuration.

Referring to FIG. 19, a pseudocode listing is provided for an example embodiment of a VM scalability method for CPU resources 1005. At line 1120 a mapping table is pre-computed containing records with a configuration descriptor for a virtual machine configuration, a CPU measurement and measurement type, and a TPP value (total processing power in portable units) calculated from the component scalability model for the hardware configuration and empirical data. At line 1121, the mapping table is stored in the database. At line 1122, a query is performed on the database with a server and VM configuration and a CPU measurement value and type. At line 1123, the query returns the closest matching record from the mapping table.

Referring to FIGS. 20A and 20B, a pseudocode listing is provided for an example method 1006 to convert ordinary CPU utilization measurements to CPU capacity consumption in portable units. At line 1129, ordinary CPU utilization is measured as the number of active threads divided by the maximum number of active threads possible for the CPU. Method 1006 is primarily used to determine processor efficiency and available capacity for a host configuration under a virtual machine load. A suitable portable unit for CPU capacity consumption is CPU-secs per unit of real time (CPU-secs/sec).

Lines 1130-1131 describe a calculation for capacity utilization as a total delivered work for a CPU divided by a CPU capacity. Lines 1132 and 1133 describe the CPU capacity as the delivered work for N_Threads where N_threads is the maximum number of threads supported by the CPU.

Lines 1134-1139 describe a calculation for the delivered work for a CPU as a weighted sum of delivered work over each processor state from 1 to N_Threads active where the weights are determined from the processor state probability. Lines 1140-1143 describe the calculation of the state probability based on a binomial distribution of processor state probabilities.

Referring to FIG. 20B, lines 1145-1152 describe the pseudocode for computing delivered work for a CPU when N threads are active, from a total delivered capacity on NCHIPS processor chips with NCORES cores. Lines 1153-1154 describes the calculation of total delivered capacity which is calculated as a total efficiency multiplied by a number of contending threads. Lines 1155-1156 describe the calculation of the number of contending threads executing on a particular core, a particular chip and with a number of tasks given. Lines 1157-1159 describe a calculation for the total efficiency for a particular core of a particular chip with a number of tasks given. The total efficiency is calculated by calling the Object_Efficiency routine. A suitable example of the Object_Efficiency routine is disclosed in the '948 reference.

Referring to FIG. 21, lines 1180-1184 describe the pseudocode for an example VMM scalability method 1007 for computing VMM efficiency. In method 1007, virtual machine monitor (VMM) CPU overhead is modeled as a function of the number of tasks executing on the host and the number of virtual CPUs configured on all the VMs on the host. At line 1180, VMM_Thread_Overhead is computed for a VMM on a host based on multiplying a MaxOverhead value for the VMM, an adjustable parameter A and N_Threads_Executing and dividing by Total_N_Processor_Threads for the host. Adjustable parameter A is in the range [0.0, 1.0]. In the example embodiment the adjustable parameter is ⅓.

At line 1181, VMM_CPU_Overhead for a VMM on a host is computed based on the MaxOverhead value for the VMM, the ones complement of adjustable parameter A, and a minimum of 1 and ratio of Total_Configured_VCPUs for the host to ReferenceNVCPUs for the VMM.

At line 1182, VMM_Total_Overhead is the sum of VMM_Thread_Overhead and VMM_VCPU_Overhead.

In lines 1180-1182, MaxOverhead value for a VMM is defined as the maximum CPU overhead imposed by the VMM on the host, N_Threads_Executing is the number of processor threads currently executing a task, Total_N_Processor_Threads is the total number of processor threads configured on the host, Total_Configured_VCPUs for a host is the total number of virtual CPUS configured on all VMS assigned to the host and ReferenceNVCPUs for a VMM is the number of virtual CPUs at which VMM_VCPU_Overhead for the VMM reaches its maximum. MaxOverhead(VMM) function and Reference NVCPUs(VMM) are model parameters derived empirically.

In an embodiment, given a particular placement, N_Threads_Executing on a host is computed as shown in lines 1183-1184 where N_Threads_Executing is a ratio of the total consumption of VMs on the host to the total capacity (permitted consumption) of each physical processor thread on the host.

In an alternate embodiment, for efficiency of the placement process, an estimation is made and substituted for lines 1183-1184, that the number of threads executing (N_Threads_Executing) is the maximum (Total_N_Processor_Threads) so that N_Threads_Executing is not recomputed for each candidate placement. This estimation is also made, if the number of threads executing is unknown.

Also, when Total_Configured_VCPUs is unknown, the maximum value of ReferenceNVCPUs is used for Total_Configured_VCPUs.

For VMM memory overhead on a host, the memory available to VMs is reduced on that host and can be estimated as a simple function of memory consumption by the VMs on the host, the number of VCPUs configured on the VMs on the host and the VMM type. The simple function is determined empirically.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An infrastructure management system comprising:
 a first server comprising a first processor, a first memory, and a first set of program instructions stored in the first memory;
 wherein the first processor when executing the first set of program instructions:
  receives a set of resource utilization data for a set of resources associated with a source computing system;
  determines, based on the set of resource utilization data, a set of virtual machine resource consumptions for the source computing system;
  receives a source configuration comprising a set of physical machine configurations and a set of virtual machine configuration;
  determines a set of host resource capacities based on the source configuration;
  estimates a guest operating system overhead consumption for the set of virtual machine configuration;
  determines a set of planning percentiles for the set of virtual machine resource consumptions;
  determines a first placement of a target set of virtual machines on a target set of hosts on a target computing system, based on the set of host resource capacities and the set of virtual machine resource consumptions;
  determines, for each virtual machine of the target set of virtual machines, whether the virtual machine can be right-sized;
  determines a set of right sizing policies comprising an allowed set of host configurations and an allowed set of virtual machine configurations;
  modifies the first placement to meet the set of right sizing policies, based on the set of planning percentiles, to obtain a second placement; and,
  wherein the second placement comprises a set of virtual machine-host pairs from the target set of hosts and the target set of virtual machines.

2. The infrastructure management system of claim 1 wherein a selected host resource capacity of the set of host resource capacities is derived from a set of component capacities, a processor efficiency, a virtual machine monitor efficiency and a capacity reserve.

3. The infrastructure management system of claim 1 wherein the first processor when executing the first set of program instructions further:
transforms the resource utilization data into the set of virtual machine resource consumptions for a set of regularized time blocks.

4. The infrastructure management system of claim 1 wherein the first processor when executing the first set of program instructions further:
determines a threshold requirement; and,
determines the second placement for the target set of hosts and the target set of virtual machines to meet the threshold requirement.

5. The infrastructure management system of claim 1 wherein the first processor when executing the first set of program instructions further:
determines a total virtual machine resource consumption of each resource in a set of resources for all virtual machines assigned to the second placement;
determines an available capacity of each resource in the set of resources assigned to the second placement;
determines a normalized difference between the available capacity and the total virtual machine consumption; and,
determines a number of hosts to add to the target set of hosts based on the normalized difference.

6. The infrastructure management system of claim 5 wherein the first processor when executing the first set of program instructions further:
determines a number of hosts to remove from the target set of hosts, based on the normalized difference.

7. The infrastructure management system of claim 5 wherein the first processor when executing the first set of program instructions further:
determines the total virtual machine resource consumption as a statistical percentile of the set of virtual machine resource consumptions for the target set of virtual machines.

8. The infrastructure management system of claim 1 wherein the first processor when executing the first set of program instructions further:
removes a set of movable virtual machines from a source computing system;
installs the set of movable virtual machines in the target computing system according to the second placement; and,
installs a set of new virtual machines in the target computing system according to the second placement.

9. A method of reconfiguration of a source computing system into a target computing system, comprising:
receiving a set of resource utilization data for a set of resources associated with a source computing system;
determining, based on the set of resource utilization data, a set of virtual machine resource consumptions for the source computing system; and
receiving a source configuration comprising a set of physical machine configurations and a set of virtual machine configuration;
determining a set of host resource capacities based on the source configuration;
estimating a guest operating system overhead consumption for the set of virtual machine configuration;
determining a set of planning percentiles for the set of virtual machine resource consumptions;
determining a first placement of the target set of virtual machines on the target set of hosts from the set of host resource capacities and the set of virtual machine resource consumptions, the first placement comprising a set of virtual machine-host pairs from the target set of hosts and the target set of virtual machines;
determining, for each virtual machine of the target set of virtual machines, whether the virtual machine can be right-sized;
determining a set of right sizing policies comprising an allowed set of host configurations and an allowed set of virtual machine configurations; and,
modifying the first placement to meet the right sizing policies based on the set of planning percentiles to obtain a second placement.

10. The method of claim 9 further comprising:
transforming the resource utilization data into the set of virtual machine resource consumptions for a set of regularized time blocks.

11. The method of claim 9 further comprising:
removing a set of movable virtual machines from the source computing system;
installing the set of movable virtual machines in the target computing system according to the second placement; and,
installing a set of new virtual machines in the destination computing system according to the second placement.

12. The method of claim 9 further comprising:
determining a threshold requirement; and,
determining the second placement for the target set of hosts and the target set of virtual machines to meet the threshold requirement.

13. The method of claim 12 further comprising:
determining a total virtual machine resource consumption of each resource in a set of resources for all virtual machines assigned to the second placement;
determining an available capacity of each resource in the set of resources assigned to the second placement;
determining a normalized difference between the available capacity and the total virtual machine consumption; and,
determining a number of hosts to add to the target set of hosts based on the normalized difference.

14. The method of claim 13 further comprising:
determining a number of hosts to remove from the target set of hosts, based on the normalized difference.

15. The method of claim 13 further comprising:
determining the total virtual machine resource consumption as a statistical percentile of the set of virtual machine resource consumptions for the target set of virtual machines.

* * * * *